United States Patent
Nihei et al.

(10) Patent No.: US 10,549,691 B2
(45) Date of Patent: Feb. 4, 2020

(54) DISTANCE MEASUREMENT DEVICE, MOVEABLE DEVICE, AND DISTANCE MEASURING METHOD

(71) Applicant: Ricoh Company, Ltd., Tokyo (JP)

(72) Inventors: Yasuhiro Nihei, Kanagawa (JP); Koji Masuda, Kanagawa (JP); Takeshi Ogawa, Kanagawa (JP); Hiroaki Tanaka, Tokyo (JP); Shu Takahashi, Kanagawa (JP); Masahiro Itoh, Kanagawa (JP); Yoichi Ichikawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 501 days.

(21) Appl. No.: 15/403,594

(22) Filed: Jan. 11, 2017

(65) Prior Publication Data
US 2017/0199271 A1    Jul. 13, 2017

(30) Foreign Application Priority Data

Jan. 13, 2016 (JP) ................................ 2016-004192
Feb. 24, 2016 (JP) ................................ 2016-033079

(51) Int. Cl.
| G01S 17/00 | (2006.01) |
| B60Q 11/00 | (2006.01) |
| H05B 37/02 | (2006.01) |
| G01S 17/10 | (2006.01) |
| G01S 17/93 | (2006.01) |

(52) U.S. Cl.
CPC ............ B60Q 11/005 (2013.01); G01S 17/10 (2013.01); H05B 37/0227 (2013.01); *G01S 17/936* (2013.01)

(58) Field of Classification Search
USPC ........................................................ 356/5.01
See application file for complete search history.

(56) References Cited

U.S. PATENT DOCUMENTS

| 5,438,416 A * | 8/1995 | Nater ..................... G01D 5/305 356/614 |
| 5,450,202 A * | 9/1995 | Tisue ..................... G01D 5/305 318/561 |
| 5,627,636 A * | 5/1997 | Nishino ................ G01S 17/936 356/5.05 |

(Continued)

FOREIGN PATENT DOCUMENTS

| JP | 11-094542 | 4/1999 |
| JP | 2001-148868 | 5/2001 |

(Continued)

OTHER PUBLICATIONS

U.S. Appl. No. 15/180,560, filed Jun. 13, 2016.

*Primary Examiner* — James R Hulka
(74) *Attorney, Agent, or Firm* — XSENSUS LLP

(57) ABSTRACT

A distance measurement device includes a projection optical system, a light-receiving system to receive light projected from projection optical system and reflected by an object; and a correction system to correct a difference in timing of light emission between the plurality of light sources. The projection optical system includes a plurality of light sources and a plurality of drive circuits to drive the plurality of light sources.

11 Claims, 17 Drawing Sheets

(56) References Cited

U.S. PATENT DOCUMENTS

| | | | | |
|---|---|---|---|---|
| 7,417,718 | B2* | 8/2008 | Wada | G01S 7/493 356/5.01 |
| 9,109,888 | B2* | 8/2015 | Korekado | G01C 3/08 |
| 2002/0105631 | A1* | 8/2002 | Nonaka | G01C 3/08 356/3.14 |
| 2007/0097349 | A1* | 5/2007 | Wada | G01S 7/493 356/4.06 |
| 2007/0195330 | A1* | 8/2007 | Ohashi | A61B 5/0059 356/498 |
| 2007/0215787 | A1* | 9/2007 | Suzuki | G01J 1/26 250/201.1 |
| 2011/0235018 | A1* | 9/2011 | Mori | G01C 3/08 356/5.01 |
| 2012/0173184 | A1* | 7/2012 | Ovsiannikov | G01S 17/08 702/97 |
| 2012/0307229 | A1* | 12/2012 | Conroy | G01S 17/36 356/5.1 |
| 2013/0278917 | A1* | 10/2013 | Korekado | G01C 3/08 356/5.01 |
| 2015/0092994 | A1 | 4/2015 | Masuda et al. | |
| 2015/0265853 | A1* | 9/2015 | Humphrey | A61N 5/1048 600/1 |

FOREIGN PATENT DOCUMENTS

| | | |
|---|---|---|
| JP | 2006-308496 | 11/2006 |
| JP | 2015-068748 | 4/2015 |
| JP | 2015-108629 | 6/2015 |
| JP | 2016-008875 | 1/2016 |

* cited by examiner

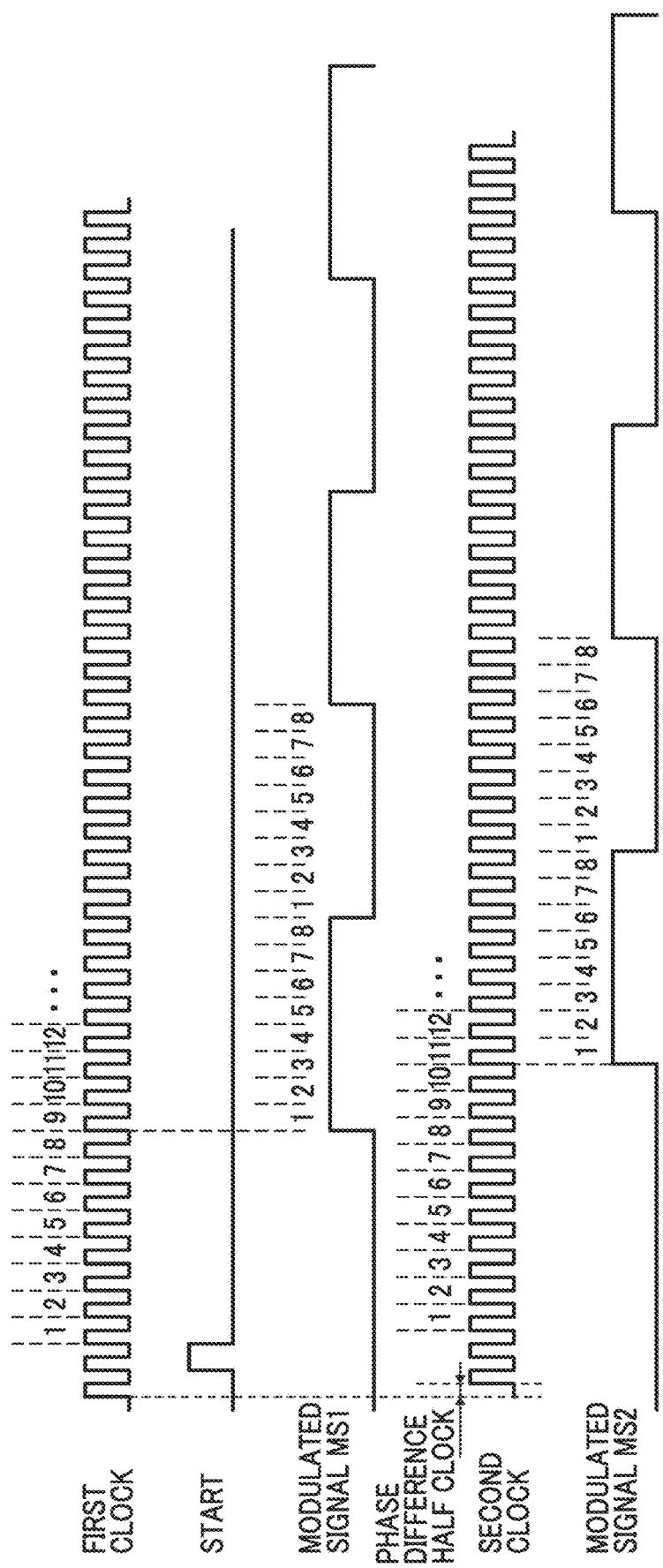

DISTANCE MEASUREMENT DEVICE, MOVEABLE DEVICE, AND DISTANCE MEASURING METHOD

CROSS-REFERENCE TO RELATED APPLICATIONS

This patent application is based on and claims priority pursuant to 35 U.S.C. § 119(a) to Japanese Patent Application No. 2016-004192, filed on Jan. 13, 2016 and Japanese Patent Application No. 2016-033079, filed on Feb. 24, 2016 in the Japan Patent Office, the entire disclosures of which are hereby incorporated by reference herein.

BACKGROUND

Technical Field

Embodiments of the present disclosure relate to a distance measurement device, a movable device, and a distance measuring method.

Related Art

In recent years, there have been developed various devices for receiving light that is emitted from a projection optical system to an object and reflected by the object to detect the distance to the object.

For example, a device is proposed that includes a projection optical system including a plurality of light sources and a plurality of drive circuits to drive the plurality of light sources, respectively, to emit light and measure the distance to an object.

However, in the above-described device, there is room for improvement in accuracy of the measurement of the distance to the object.

SUMMARY

In an aspect of this disclosure, there is provided a distance measurement device that includes a projection optical system, a light-receiving system to receive light projected from projection optical system and reflected by an object; and a correction system to correct a difference in timing of light emission between the plurality of light sources. The projection optical system includes a plurality of light sources and a plurality of drive circuits to drive the plurality of light sources.

In another aspect of this disclosure, there is provided a movable device includes the distance measurement device as described above, and a movable body on which the distance measurement device is mounted.

In still another aspect of this disclosure, there is provided a distance measuring method includes first irradiating a reference reflector with first light emitted from one light source of a plurality of light sources; first measuring a first distance to the reference reflector by receiving the first light emitted to and reflected from the reference reflector; second irradiating the reference reflector with second light emitted from the one light source and another light source of the plurality of the light sources; second measuring a second distance to the reference reflector by receiving the second light emitted to and reflected from the reference reflector; correcting a difference in timing of light emission between the one light source and said another light source based on the first distance and the second distance; and calculating a distance to an object based on third light emitted from the one light source and said another light source at a timing of which the difference has been corrected by the correcting.

Further described is a distance measuring method includes first detecting light emitted from one light source of a plurality of light sources; first calculating a first difference in elapsed time between a timing of light emission of the one light source and a timing of the first detecting; second detecting light emitted from another light source of the plurality of light sources; second calculating a second difference in elapsed time between a timing of light emission of said another light source and a timing of the second detecting; correcting a difference in timing of light emission between the one light source and said another light source based on the first difference in elapsed time and the second difference in elapsed time; and calculating a distance to the object based on light emitted from the one light source and said another light source to an object and reflected from the object to.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 19 is a clock diagram for describing a method for generating modulated signals according to variation 6.

Figure 1:
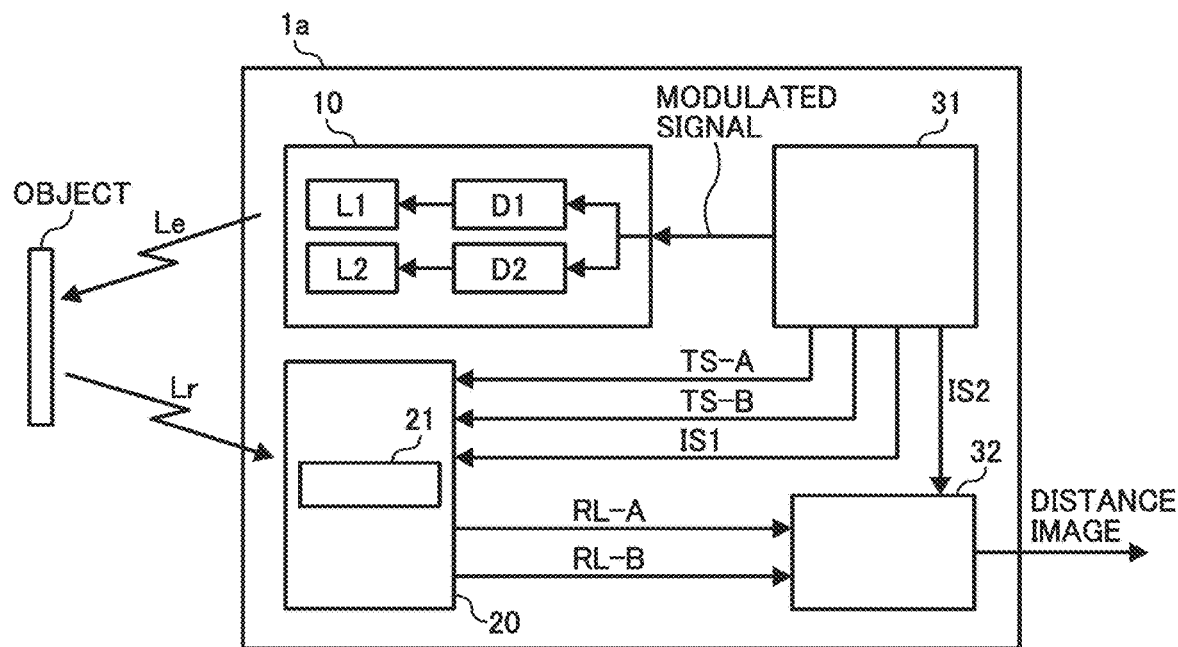
FIG. 1 is a schematic illustration of a distance measurement device according to a comparative example.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

First, a description is given of a distance measurement device 1a according to a comparative example before a description of a distance measurement device 1 according to an embodiment of the present disclosure.

Comparative Example

The distance measurement device 1a is mounted to, for example, a portion near a license plate at the front of a vehicle as a movable body.

FIG. 1 is a schematic illustration of a configuration of the distance measurement device 1a according to the comparative example. The distance measurement device 1a includes a light-projection system 10, a light-receiving system 20, a timing controller 31, and a distance calculator 32.

The light-projection system 10 includes two light sources L1 and L2, two drive circuits D1 and D2, and a projection optical system. The drive circuits D1 and D2 drive the light sources L1 and L2 to emit light. The projection optical system projects the light emitted from the light sources L1 and L2 toward the front of a vehicle. As light sources L1 and L2, for example, light emitting diodes (LED) or semiconductor lasers (LD) are used.

The drive circuits D1 and D2 receive modulated signals (pulse signals) output from the timing controller 31 and apply modulation current according to the modulated signal to the light sources L1 and L2, respectively. The light sources L1 and L2 having received the modulation current emit modulated light according to the modulation current, and the modulated light is emitted from the projection optical system, as emitted-pulsed light Le. In this case, an object (object to be measured), which is within a detectable range (detectable area by the sum of light output of the light sources L1 and L2) in the light projection range of the light projection system 10 (the projection range of the projection optical system), is irradiated with the projected light (the emitted-pulsed light Le).

The light-receiving system 20 includes an area sensor 21 and a light-receptive optical system. The area sensor 21 includes a plurality of photosensors, such as photodiodes and phototransistors. The plurality of photosensors are two-dimensionally arranged and corresponds to pixels, respectively. The light-receptive optical system includes light-collecting elements and guides light reflected from an object to the area sensor 21.

Each photosensor of the area sensor 21 includes two charge accumulation units A1 and B1. Each photosensor receives modulated light (reflected-pulsed light Lr) that has been emitted to and reflected by the object, and then accumulates charges generated by the received light, according to the timing signals TS-A and TS-B output from the timing controller 31.

Specifically, each photosensor accumulates charges on the charge accumulation unit A1 when the level of the timing signal TS-A is "H" (high), and accumulates charges on the charge accumulation unit B1 when the level of the timing signal TS-B is "H" (high).

The timing controller 31 repeatedly outputs the modulated signal, the timing signal TS-A, and the timing signal TS-B, so that each photosensor continues to accumulate charges on the charge accumulation units A1 and B1. After repetitive accumulation of charges for a predetermined times, the timing controller 31 stops outputting the modulated signal, the timing signal TS-A, and the timing signal TS-B, and outputs a first instruction signal IS1 to the area sensor 21 to instruct the area sensor 21 to output received-light data.

The area sensor 21 sequentially outputs received-light data RL-A and received-light data RL-B that are the amounts of charges accumulated on the charge accumulation units A1 and B1 of each photosensor.

The timing controller 31 outputs a second instruction signal IS2 to the distance calculator 32 to instruct the distance calculator 32 to calculate distance data for each pixel based on the received-light data RL-A and RL-B sent from the area sensor 21. Thus, the distance calculator 32 generates a distance image. The distance calculator 32 sends the generated distance image to an electronic control unit (ECU) of a vehicle, so that the ECU performs, based on the distance image, a steering control of the vehicle, such as auto-steering, and a speed control, such as autobrake. Note that the "distance image" refers to an image of which a plurality of pixels respectively represents the distance to the object to be measured.

The timing controller 31 repeatedly generates and sends the modulated signal and the timing signals TS-A and TS-B to the drive circuits D1 and D2 and the area sensor 21, respectively for the predetermined times. Subsequently, the timing controller 31 outputs the first instruction signal IS1 and the second instruction signal IS2 to the area sensor 21 and the distance calculator 32, respectively.

Figure 2:
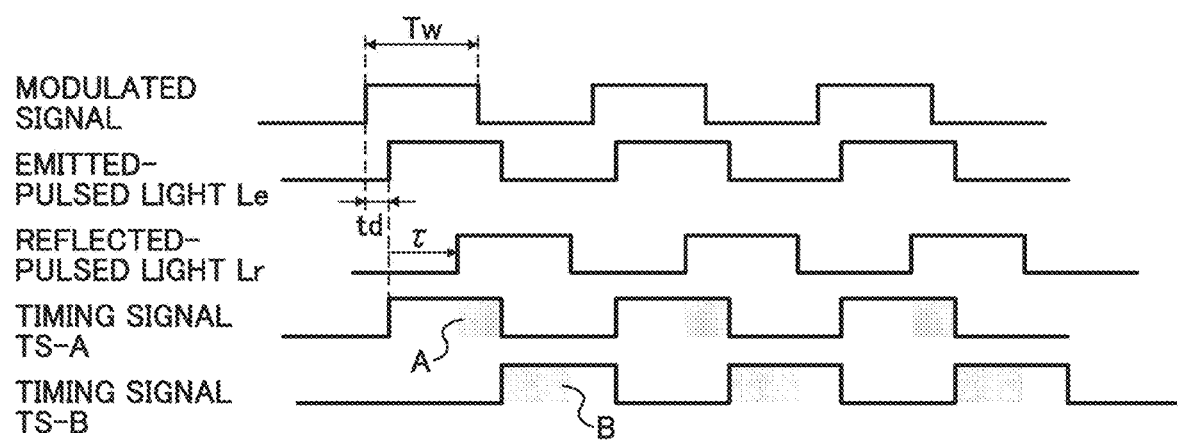
FIG. 2 is a timing chart of a modulated signal, emitted-pulsed light, reflected-pulsed light, and timing signals of the distance measurement device according to the comparative example.

FIG. 2 is a time chart of the modulated signal, the timing signals TS-A and TS-B, the emitted-pulsed light Le, and the reflected-pulse light Lr.

The modulated signal of FIG. 2 is a pulse signal with a pulse width Tw (pulse time width).

The emitted-pulsed light Le of FIG. 2 is light projected from the light-projection system 10 with a delay time td of each of the drive circuits D1 and D2, each of which has received a modulated signal with the delay time td.

The reflected-pulsed light Lr of FIG. 2 is the emitted-pulsed light Le reflected by the object and received by the area sensor 21. The waveform of the reflected-pulsed light Lr is substantially the same as the waveform of the emitted pulsed light Le. The reflected-pulsed light Lr arrives at (enters) the area sensor 21 with time τ later than the timing of rise of the emitted-pulsed light Le (the timing of emission of the light sources L1 and L2).

The time τ is a time period from a time when the light-projection system 10 projects (emits) the pulsed light (the emitted-pulsed light) Le to a time when the pulsed light (reflected-pulsed light) reflected by an object enters the area sensor 21. The time τ changes with the distance to the object. That is, with the value of time τ, the distance D to the object is determined by the following formula (1) where C denotes the speed of light.

$$D = \tau \times C/2 \qquad (1).$$

FIG. 2 represents the timing signals TS-A and TS-B output from the timing controller 31 to the area sensor 21. The timing signals TS-A and TS-B represent the timings of accumulation of charges.

The timing signal TS-A becomes "H" (high level) at the same timing as the emitted-pulsed light Le becomes "H", and becomes "L" (low level) when the time period of the pulse width Tw of the timing signal TS-A ends. The timing signal TS-B becomes "H" at the same time at which the timing signal TS-A becomes "L". Then, the timing signal TS-B becomes "L" when the time period of the pulse width Tw of the timing signal TS-B ends. During the time period in which the timing signal TS-A is "H", each photosensor accumulates charges on the charge accumulation unit A1. The gray zone indicated by the symbol "A" in FIG. 2 represents the amount of charges accumulated on the charge accumulation unit A1. During the time period in which the timing signal TS-B is "H", each photosensor accumulates charges on the charge accumulation unit B1. The gray zone indicated by the symbol "B" in FIG. 2 represents the amount of charges accumulated on the charge accumulation unit B1. When the time τ is within the range of 0≤τ≤Tw, formula (2) below is satisfied:

$$\tau/Tw = B/(A+B) \qquad (2).$$

Accordingly, the distance D is determined by the following formula derived from the above-described formulas (1) and (2):

$$D = B/(A+B) \times Tw \times C/2.$$

FIGS. 3A and 3B each is a waveform diagram of emitted-pulsed light Le1, emitted-pulsed light Le2, and the emitted-pulsed light Le. The emitted-pulsed light Le1 and the emitted-pulsed light Le2 are emitted from the light sources L1 and L2, respectively, and each waveform of the emitted-pulsed light Le1 and Le2 has the common pulse width (Tw). The emitted-pulsed light Le is light in which the emitted-pulsed light Le1 and the emitted-pulsed light Le2 are at least partly superimposed on each other.

FIG. 3A represents the case in which the delay time relative to the modulated signal is common between the drive circuits D1 and D2 in the light-projection system 10. In this case, the rising timing of the waveform of the pulsed light Le1 emitted from the light source L1 is the same as that of the pulsed light Le2 emitted from the light source L2. The same applies to the falling timings of the waveforms of the emitted-pulsed light Le1 and the emitted-pulsed light Le2. The emitted-pulsed light Le, in which the emitted-pulsed light Le1 and the emitted-pulsed light Le2 are superimposed on each other in substantially the entire part, has the pulse intensity (pulse amplitude) that is the sum of the intensity of the pulses of the emitted-pulsed light Le1 and the emitted-pulsed light Le2. The emitted-pulsed light Le has the pulse width Tw.

FIG. 3B represents the case in which with variation in capability of circuit elements and wirings between the drive circuits D1 and D2 in the light-projection system 10, the delay time relative to the modulated signal differs between the drive circuits D1 and D2. In this case, the delay time of the drive circuit D2 is shorter than the delay time of the drive circuit D1, and therefore the waveform of the emitted-pulsed light Le2 rises earlier than the waveform of the emitted-pulsed light Le1 by a time period of te and falls earlier than the waveform of the emitted-pulsed light Le1 by a time period of te. The emitted-pulsed light Le, in which the above-described above emitted-pulsed light Le1 and Le2 having different rising timings and falling timings are superimposed on each other, has the waveform with a pulse width of the sum of the time periods of Tw and te (Tw+te), as illustrated in FIG. 3B.

Figure 4:
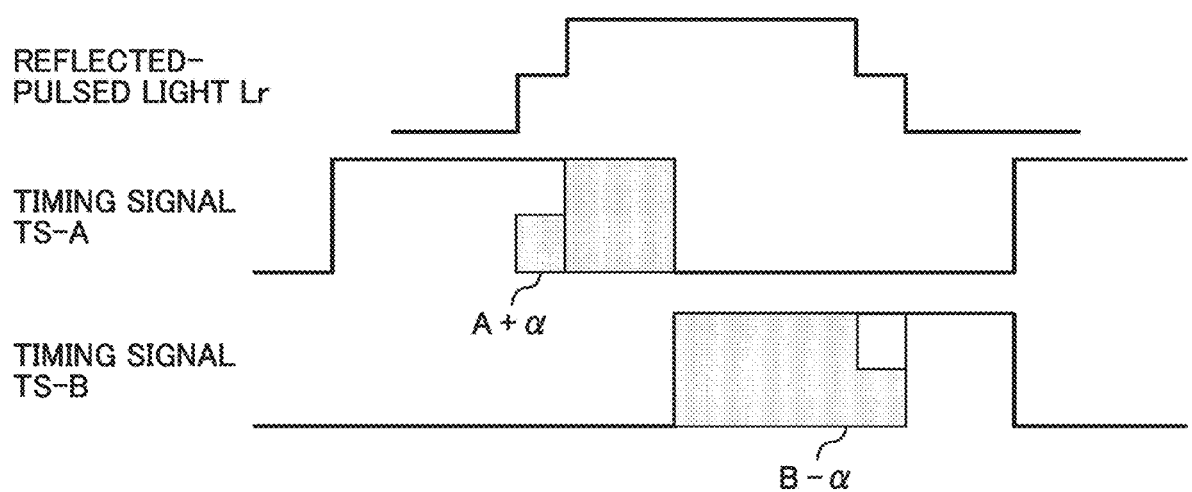
FIG. 4 is an illustration of errors in the amounts of charges accumulated on charge accumulation units of each photosensor in an area sensor.

FIG. 4 is an illustration of charges accumulated in the charge accumulation unit A1 and the charge accumulation unit B1 when the reflected-pulsed light Lr having the above-described waveform with the pulse width of the sum of the time periods of Tw and te enters the area sensor 21.

As illustrated in FIG. 4, the gray zone indicated by the symbol "A+α" refers to the amount of charges accumulated in the charge accumulation unit A1 that is greater than the amount of charges accumulated in the charge accumulation unit A1 in FIG. 2 by the amount of α. Further, in FIG. 4, the amount of charges accumulated in the charge accumulation unit B1 is represented by the gray zone indicated by the symbol "B−α" that is less than the amount of charges accumulated in the charge accumulation unit B1 in FIG. 2 by the amount of α.

In the comparative examples as described above, the amount of accumulated charges differs between the charge accumulation unit A1 and the charge accumulation unit B1, thereby resulting in an error in distance measurement.

In view of the above circumstances, the inventors has developed a distance measurement device 1 according to at least one embodiment of this disclosure to reduce the above-described error.

Embodiment

Figure 5:
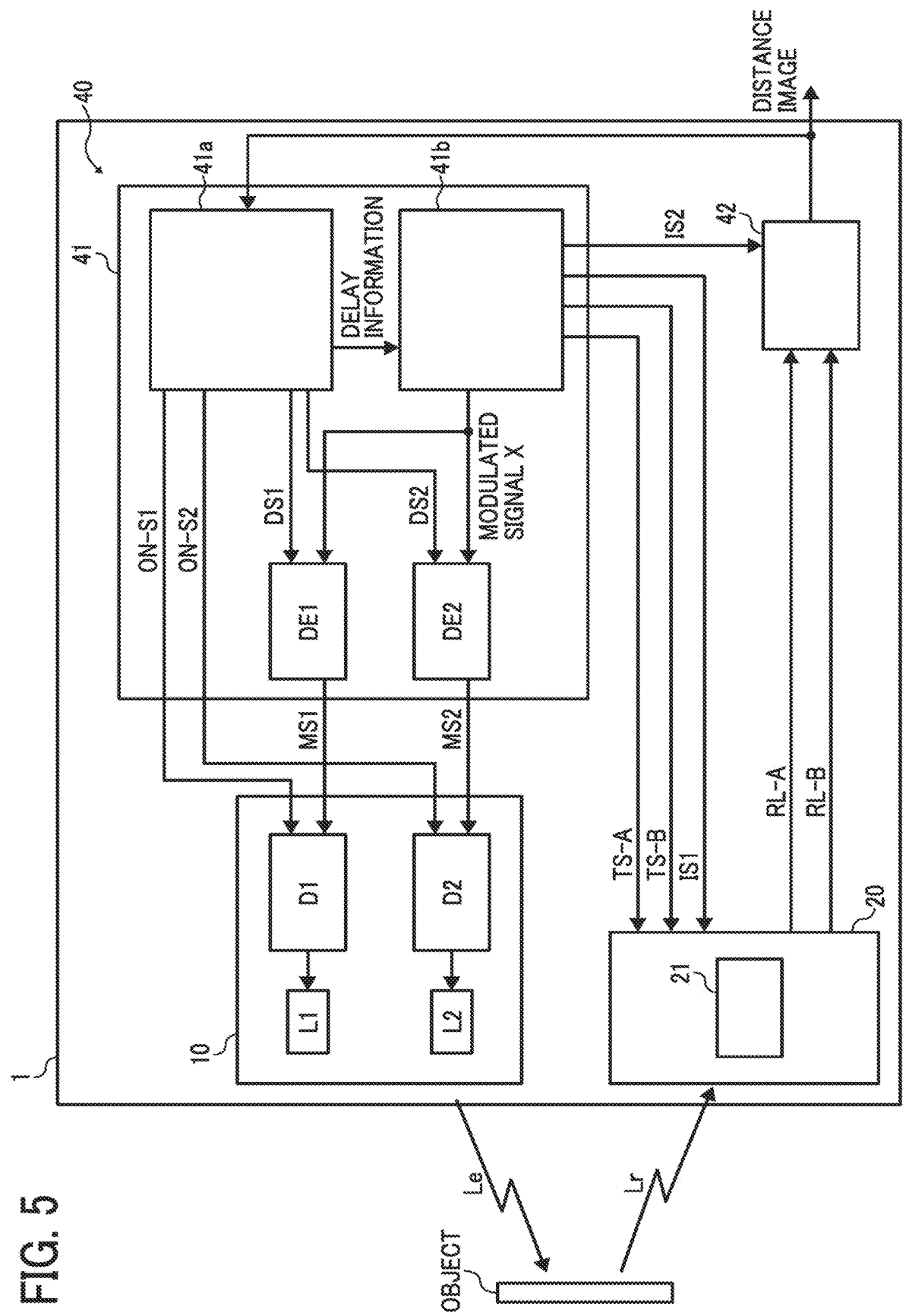
FIG. 5 is a schematic illustration of a distance measurement device according to an embodiment of the present disclosure.

Next, a description is given of the distance measurement device 1 according to at least one embodiment of the present disclosure. FIG. 5 is a schematic illustration of a configuration of the distance measurement device 1 according to the embodiment of the present disclosure.

The distance measurement device 1 is fitted, for example, to a portion near the license plate disposed at the front of a vehicle as a movable body. According to the present embodiment, examples of the movable body, on which the distance measurement device 1 is mounted, include an airplane, a vessel, and a robot, in addition to a vehicle.

The distance measurement device 1 includes a light-projection system 10, a light-receiving system 20, and a controller 40 that includes a timing controller 41 and a distance calculator 42 (calculator).

The light-projection system 10 includes two light sources L1 and L2, two drive circuits D1 and D2, and a projection optical system. The drive circuits D1 and D2 drive the light sources L1 and L2 to emit light. The projection optical system projects the light emitted from the light sources L1 and L2 toward the front of a vehicle. In the present embodiment, a semiconductor laser (an end-surface emitting laser (LD)), a vertical-cavity surface-emitting lasers (VCSEL), and a light emitting element, such as LEDs, are suitable for the light source. Alternatively, other types of light emitting element may be employed.

When the timing controller 41 sends a first-ON signal ON-S1 that is at the high level to the drive circuit D1, the drive circuit D1 applies modulation current MC1 according to a modulated signal MS1 to the light source L1. When the first-ON signal ON-S1 sent from the timing controller 41 is at the low level, the drive circuit D1 does not generate a drive current (drive current is OFF).

When the timing controller 41 sends a second-ON signal ON-S2 that is at a "H" level to the drive circuit D2, the drive circuit D2 applies modulation current MC2 according to a modulated signal MS2 to the light source L2. When the second-ON signal ON-S2 sent from the timing controller 41 is at an "L" (low) level, the drive circuit D2 does not generate a drive current (drive current is OFF).

The light source L1 having received the modulation current MC1 emits modulated light according to the modulation current MC1, and the modulated light is emitted from a projection optical system, as emitted-pulsed light Le1.

The light source L2 having received the modulation current MC2 emits modulated light according to the modulation current MC2, and the modulated light is emitted from a projection optical system, as emitted-pulsed light Le2.

More specifically, the emitted-pulsed light Le, which is projected from the light-projection system 10, is light in which the emitted-pulsed light Le1 and the emitted-pulsed light Le2 are superimposed on each other.

In this case, an object (object to be measured) is irradiated with the projected light (the emitted-pulsed light Le), that is within a detectable range (detectable area by the sum of light output of the light sources L1 and L2) in the light projection range of the light-projection system 10 (the projection optical system).

The projection optical system according to the present embodiment may be at least one of a scanning optical system that includes, for example, a light deflector, and a non-scanning optical system that includes, for example, a diffusing board. In either case, the projection optical system preferably achieves a sufficient projection range in a horizontal direction and a vertical direction to detect (sense) an object in the area in front of a vehicle.

The scanning projection optical system that projects collimated light rays relatively increases power density of light emitted onto the object, thus successfully increasing optical signal-to-noise (SN) ratio. By contrast, the non-scanning projection optical system that projects diverging light rays allows a measurement of distances to multiple parts of the object at the same time with one-time projection of light, thereby rapidly obtaining high-resolution spatial distribution of the distances to the object.

The light-receiving system 20 includes an area sensor 21 and a light-receptive optical system. The area sensor 21 includes a plurality of photosensors, such as photodiodes and phototransistors. The plurality of photosensors are two-dimensionally arranged and corresponds to pixels, respectively. The light-receptive optical system includes light-collecting elements and guides light reflected from an object to the area sensor 21.

Each photosensor of the area sensor 21 includes two charge accumulation units A1 and B1. Each photosensor receives modulated light (reflected-pulsed light Lr) that has been emitted to and reflected by the object, and then accumulates charges generated by the received light, according to the timing signals TS-A and TS-B output from the timing controller 41.

Specifically, each photosensor accumulates charges on the charge accumulation unit A1 when the timing signal TS-A is "H", and accumulates charges on the charge accumulation unit B1 when the timing signal TS-B is "H".

The timing controller 41 repeatedly outputs modulated signals MS1 and MS2, the timing signal TS-A, and the timing signal TS-B, so that each photosensor continues to accumulate charges on the charge accumulation units A1 and B1. After repetitive accumulation of charges for a predetermined times, the timing controller 41 stops outputting the modulated signals MS1 and MS2 and the timing signal TS-A and TS-B, and outputs a first instruction signal IS1 to the area sensor 21 to instruct the area sensor 21 to output received-light data.

The area sensor 21 sequentially outputs received-light data RL-A and received-light data RL-B that respectively represent the amounts of charges accumulated on the charge accumulation units A1 and B1 of each photosensor.

The timing controller 41 outputs a second instruction signal IS2 to the distance calculator 42 to instruct the distance calculator 42 to calculate distance data for each pixel based on the received-light data RL-A and RL-B sent from the area sensor 21. Thus, the distance calculator 42 generates a distance image. The distance data is calculated from the received light data RL-A and RL-B in the above-described manner.

The timing controller 41 includes delay elements DE1 and DE2, a regulator 41a, and a signal generator 41b.

The delay element DE1 delays a modulated signal X generated by the signal generator 41b, according to the level of a first delay signal DS1 sent from the regulator 41a, and outputs the delayed modulated signal X as a modulated signal MS1.

The delay element DE2 delays a modulated signal X generated by the signal generator 41b, according to the level of a second delay signal D S2 sent from the regulator 41a, and outputs the delayed modulated signal X as a modulated signal MS2.

As described above, the timings of light emission at the light sources L1 and L2 (the rising timings of the waveforms of the emitted-pulsed light Le1 and the emitted-pulsed light Le2) change with the first delay signal DS1 and the second delay signal DS2, respectively.

The signal generator 41b repeatedly generates and outputs a pulsed or sinusoidal modulated signal X to the delay elements DE1 and DE2 predetermined times. The signal generator 41b repeatedly generates, based on delay information output from the regulator 41a, a timing signal TS-A and a timing signal TS-B, each having the same waveform as that of the modulated signal X, and repeatedly outputs the generated timing signals TS-A and TS-B to the area sensor 21 for predetermined times.

In the present embodiment, the signal generator 41b preferably outputs the timing signal TS-A at the same timing as the rising timing of the waveform of the emitted-pulsed light Le (the timing of emission of the light source L1) as illustrated in FIG. 2. The delay information refers to delay time that is a time period from a time when the modulated signal X is output from the signal generator 41b to a time when the emitted-pulsed light Le is output from the light source L1 (the waveform of the emitted-puled light Le rises). Based on such delay time (delay information), the timing of output of the timing signal TS-A is set to coincide with the timing of emission of light source L1. As described above, the timing signal TS-A becomes "H" at the same timing as the emitted-pulsed light Le becomes "H", and becomes "L" when the time period of the pulse width Tw of the timing signal TS-A ends. The timing signal TS-B becomes "H" at the same time at which the timing signal TS-A becomes "L". Then, the timing signal TS-B becomes "L" when the time period of the pulse width Tw of the timing signal TS-B ends.

The signal generator 41b repeatedly generates and sends the modulated signal X and the timing signals TS-A and TS-B to the delay elements DE1 and DE2 and the area sensor 21, respectively for the predetermined times. Subsequently, the signal generator 41b outputs the first instruction signal IS1 and the second instruction signal IS2 to the area sensor 21 and the distance calculator 42, respectively.

The regulator 41a generates, based on distance data sent from the distance calculator 42, the first delay signal DS1 and the second delay signal DS2 to regulate the amounts of delay of the delay elements DE1 and DE2. The regulator 41a generates a first-On signal ON-S1 and a second-ON signal ON-S2 to control the drive circuits D1 and D2 of the light-projection system 10 to switch between ON and OFF, respectively. The regulator 41a controls the first-On signal ON-S1 and the second-ON signal ON-S2 to correct the time lag between the timings of emission of the light sources L1 and L2.

Figure 6:
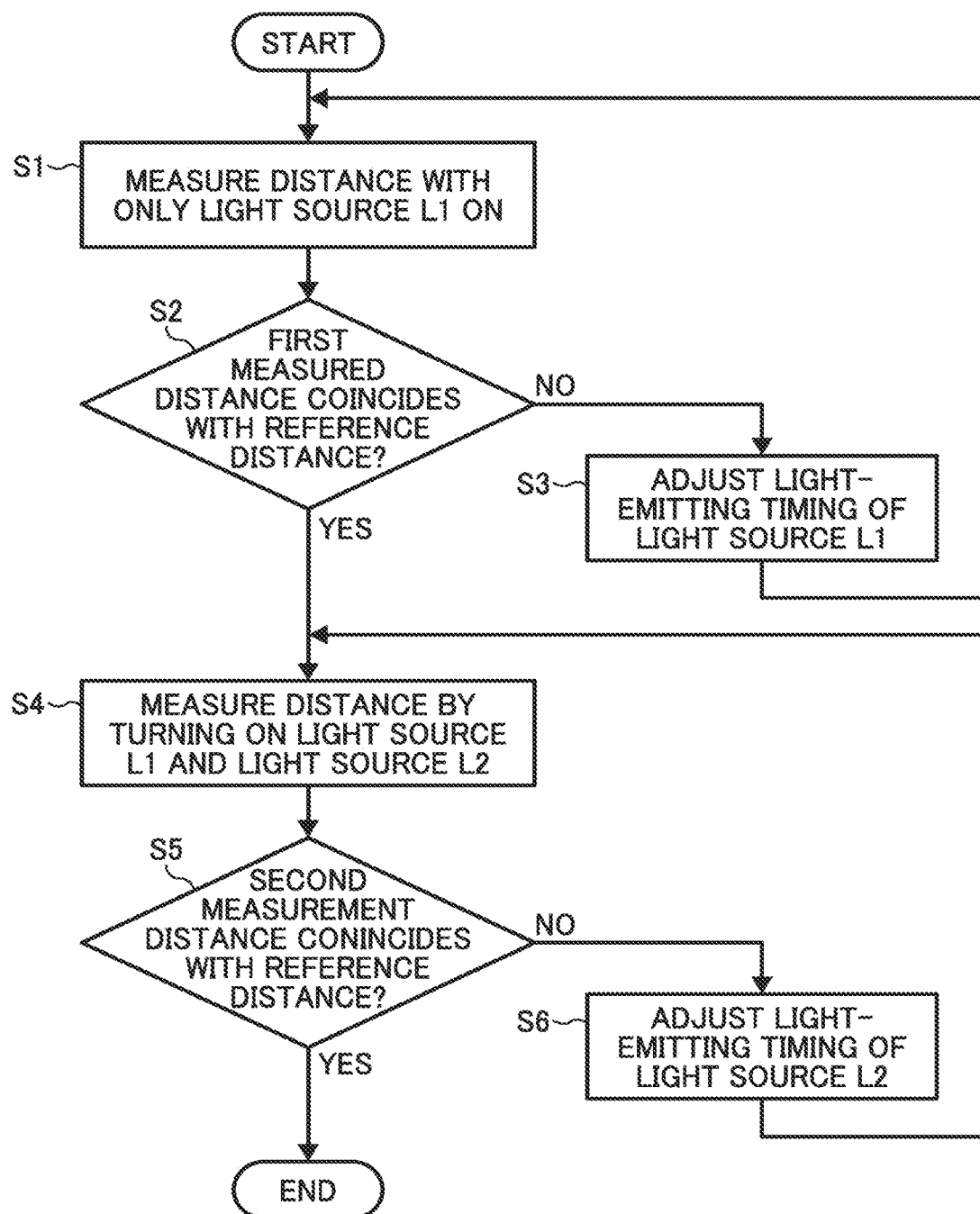
FIG. 6 is a flowchart of a correction process for correcting a difference in timing of light emission between light sources.

The following describes the method (a correction process for the difference in timing of emission) for correcting the difference in timing of emission between the light sources L1 and L2 in the distance measurement device 1 according to the present embodiment, referring to FIG. 6. FIG. 6 is a flowchart of a series of computational algorithms executed by the controller 40, according to the present embodiment. In the present embodiment, the correction process for the difference in timing of emission is performed at prescribed time intervals, in consideration of variations in capability of circuit elements and wirings between the drive circuits D1 and D2 in manufacturing or over time. Alternatively, the correction process may be irregularly (e.g., in starting the distance measurement device) performed.

In the correction process for the difference in timing of light emission according to the present embodiment, a reference reflector having a predetermined reflectivity that is used as an object to be measured is disposed at the position with a reference distance Dref as a reference point within the light projection range of the light-projection system 10. The "reference distance Dred" refers to the distance in which the reference reflector is detectable when only the light source L1 is turned on (emits light). The reference distance Dref is substantially determined depending on the light output (the amount of the light emission) of the light source L1 and the reflectivity of the reference reflector.

Note that light attenuates in inverse proportion to the square of the distance so that the intensity of light decreases with the distance. To successfully perform the distance measurement with a long distance to an object, two light sources L1 and L2 are used to increase the amount of irradiated light at a distant place. Further, if an object to be measured is disposed near the distance measurement device 1, the sufficient amount of irradiated light is obtained to successfully measure the distance even with only the light source L1 turned on.

In step S1, the controller 40 causes only the light source L1 to emit light (turns on the light source L1) to perform distance measurement.

Specifically, the regulator 41a sets the first-On signal ON-S1 and the second-ON signal ON-S2 to the levels of "H" and "L", respectively.

Subsequently, the regulator 41a sets the first delay signal DS1 to a prescribed value, and generates delay information in consideration of the value of the first delay signal DS1 and the representative value of the amount of delay of the drive circuit D1, outputting the delay information to the signal generator 41b.

The signal generator 41b generates the modulated signal X, and also generates, based on the modulated signal X and the above-described delay information, the timing signals TS-A and TS-B. In this case, only the first-ON signal ON-S1 is at the level of "H" (the high level), and accordingly only the light source L1 emits light according to the modulated signal MS1 that has been output with delay time in accordance with the modulated signal X and the first delay signal DS1.

As a result, the reference reflector is irradiated with the emitted-pulsed light Le1 emitted from only the light source L1, and the area sensor 21 receives the reflected-pulsed light Lr reflected from the reference reflector. Subsequently, each photosensor accumulates charges on the charge accumulation units A1 and B1 according to the timing signals TS-A and TS-B, respectively.

The area sensor 21 outputs data regarding the accumulated charges of the charge accumulation units A1 and B1 as the received-light data RL-A and received-light data RL-B to the distance calculator 32. The distance calculator 32 calculates the distance based on the received-light data RL-A and RL-B, outputting a first measured distance.

In this case, the amount of delay of the drive circuit D1 might differ from the representative value thereof due to variations in capability of circuit elements and wirings. This causes a difference between the timing of light emission of the light source L1 and the timing at which the signal generator 41b outputs the timing signal TS-A based on the representative value, thereby causing the first measured distance to fail to coincide with the reference distance Dref. When the first measured distance fails to coincide with the reference distance Dref, the timing of the light source L1 (the rising timing of the waveform of the emitted-pulsed light Le1) differs from the timing of output of the timing signal TS-A.

Accordingly, in step S2, the controller 40 determines whether the first measured distance coincides with the reference distance Dref. When a negative determination is made in step S2, the process shifts to step S3. When an affirmative determination is made in step S2, the process shifts to step S4.

In step S3, the controller 40 adjusts the timing of light emission of the light source L1. More specifically, the controller 40 controls the regulator 41a to generate the first delay signal DS1 based on the difference between the first measured distance and the reference distance Dref, and outputs the generated first delay signal DS1 to the delay element DE1. Subsequently, the delay element DE1 delays a modulated signal X according to the level of the first delay signal DS1, and outputs the delayed modulated signal X as a modulated signal MS1 to the drive circuit D1. The drive circuit D1 applies a modulated current MC1 according to the modulated signal MS1 to the light source L1, and accordingly the light source L1 emits modulated light according to the modulated current MC1 as the emitted-pulsed light Le1.

When step S3 is completed, the process returns to step S1. The controller 40 turns on only the light source L1 to perform the distance measurement again in step S1, and confirms whether the first measured distance coincides with the reference distance Dref in step S2.

In step S4, the controller 40 causes the light sources L1 and L2 to emit light (turns on the light sources L1 and L2) to perform distance measurement.

Specifically, the regulator 41a sets both the first-On signal ON-S1 and the second-ON signal ON-S2 to the levels of "H". In step S4, the controller 40 sets the delay signal DS2 to the same value as that of the delay signal DS1 that has been used in step S1 in which only the light source L1 is turned on.

Subsequently, the signal generator 41b outputs a modulated signal X and timing signals TS-A and TS-B, and the distance calculator 42 calculates a second measured distance in the same manner as in step S1.

Figure 3:
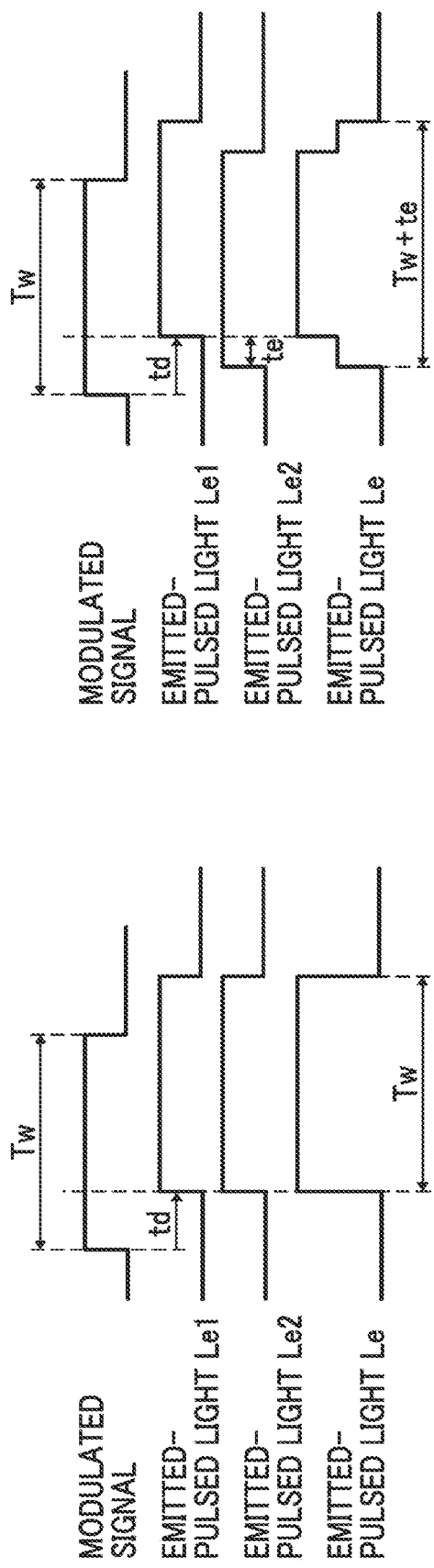
FIG. 3A is a timing chart of two emitted-pulsed light waveforms having a common delay time relative to the modulated signal.
FIG. 3B is a timing chart of two emitted-pulsed light waveforms having different delay times relative to the modulated signal.

In this case, if the amount of delay of the drive circuit D2 differs from that of the drive circuit D1, the timings of light emission of the light sources L1 and L2 differ from each other, so that the waveform of the emitted-pulsed light Le, in which the pulsed light Le1 and Le2 emitted from the light sources L1 and L2 are superimposed on each other, differs from a desired waveform (rectangular in FIG. 3). As a result, the error in measured distance might arise as described above with reference to FIG. 3.

Accordingly, in step S5, the controller 40 determines whether the second measured distance coincides with the reference distance Dref. When a negative determination is made in step S5, the process shifts to step S6. When an affirmative determination is made in step S5, the process ends. In this case (an affirmative determination is made in step S5), the timing of light emission of the light source L1 coincides with that of the light source L2.

In step S6, the controller 40 adjusts the timing of light emission of the light source L2. More specifically, the regulator 41a generates the second delay signal DS2 based on the difference between the second measured distance and the reference distance Dref, and outputs the generated second delay signal DS2 to the delay element DE2. Subsequently, the delay element DE2 delays a modulated signal X according to the second delay signal DS2, and outputs the delayed modulated signal X as a modulated signal MS2 to the drive circuit D2. The drive circuit D2 applies a modulated current MC2 according to the modulated signal MS2 to the light source L2, and accordingly the light source L2 emits modulated light according to the modulated current MC2 as the emitted-pulsed light Le2.

When step S6 is completed, the process returns to step S4. The controller 40 turns on the light sources L1 and L2 to perform the distance measurement again in step S4, and confirms whether the second measured distance coincides with the reference distance Dref in step S5.

As described above, the correction system adjusts the timings of light emission of the light sources L1 and L2, thus correcting the difference in timing of light emission between the light sources L1 and L2. In measuring distance with such light sources L1 and L2 of which the timings of light emission are corrected, errors in distance measurement are reduced and the accuracy of measurement of distance is improved.

The above-described distance measurement device 1 according to the present embodiment includes the light projection system 10, a light-receiving system 20, and a correction system. The light projection system 10 includes a plurality of light sources (e.g., two light sources L1 and L2) and a plurality of drive circuits (e.g., two drive circuits D1 and D2) that drives the plurality of light sources, respectively. The light-receiving system 20 receives light emitted from the light projection system 10 and reflected by an object. The correction system corrects the difference in the timing of light emission between the plurality of light sources.

In this configuration, the light-receiving system 20 receives light projected from the light-projection system 10 and reflected from the object with the difference in the timing of light emission between the plurality of light sources being corrected. This reduces the occurrence of an error in detection, thus improving the accuracy of the measurement of a distance to an object.

The correction system includes a controller 40 to correct differences in timing of light emission between the plurality of light sources based on data regarding the light received at the light-receiving system 20.

This configuration allows measuring a distance to an object and correcting differences in timing of light emission between the plurality of light sources based on the data regarding the light received at the light-receiving system 20.

This configuration in which the plurality of light sources emits light rays and the emitted light rays are superimposed on each other increases the amount of projected light (emitted light rays), thus increasing a maximum detection distance in which an object is detectable.

The drive circuits D1 and D2 receive a plurality of modulated signals (e.g., two modulated signals MS1 and MS2) to cause the light sources L1 and L2 to emit light, respectively. The controller 40 includes a calculator (distance calculator 42) and a control device (timing controller 41). The calculator calculates a distance to an object based on the data regarding the light received at the light-receiving system 20. The control device adjusts, based on the results calculated by the calculator, the timings of input of the modulated signals MS1 and MS2 into the drive circuits D1 and D2.

Such a configuration improves the accuracy of the measurement of a distance to an object.

The control device (timing controller 41) preferably adjusts the timings of output of the modulated signals MS1 and MS2 to the drive circuits D1 and D2 based on the difference between a first distance (first measured distance) and a second distance (second measured distance). The first distance is the distance calculated by the distance calculator 42 when only the light source L1 emits light. The second distance is the distance calculated by the distance calculator 42 when both of the light sources L1 and L2 emit light. Specifically, the control device preferably adjusts the timings of input of the modulated signals MS1 and MS2 into the drive circuits D1 and D2 to decrease the difference (that includes "0") between the first distance and the second distance.

Such a configuration allows a simple method for correcting the difference in timing of light emission between the light sources L1 and L2, in which the control device generates a common (a single) modulated signal X that is to be modulated signals MS1 and MS2, and adjusts the timings of input of the modulated signal X (modulated signals MS1 and MS2) to the drive circuits D1 and D2.

In the distance measurement device 1 further including a reference reflector disposed at a position of the distance that can be measured with the light source L1 turned on to emit light, within the projection range of the light-projection system 10, the timings of light emission of the light sources L1 and L2 are corrected (a correction process for the light emission timing) as necessary.

The control device preferably includes a regulator 41a and adjustment elements (delay elements DE1 and DE2).

The regulator 41a generates adjustment signals (a first delay signal DS1 and a second delay signal DS2) to adjust the timings of input of the modulated signals MS1 and MS2 based on the first distance and the second distance. The adjustment elements adjust the timings of input of the modulated signals MS1 and MS2 according to the adjustment signals.

When the light-receiving system 20 includes the area sensor 21 that includes photoreceptors corresponding to a plurality of pixels, the controller 40 generates a distance image that represents distance information for each site (each pixel). Such a configuration allows a detection of the size and shape of an object, thus obtaining information regarding the object in detail.

The area sensor 21 that includes two charge accumulation units A1 and B1 for each pixel accumulates charges of reflected light in the two charge accumulation units A1 and B1 for a predetermined period of time based on the timings of light emission of the light sources L1 and L2.

Further, a movable device including the distance measurement device 1 according to the present embodiment and a movable body mounted on the distance measurement device 1 allows the control of the movable body (a steering control and a speed control) based on the distance measured in a high-precision manner.

A distance measuring method according to the present embodiment includes A distance measuring method according to the present embodiment includes first irradiating a reference reflector with first light emitted from one light source (a light source L1) of a plurality of light sources (the light source L1 and a light source L2); first receiving the first light emitted to and reflected from the reference reflector to measure a first distance to the reference reflector; second irradiating the reference reflector with second light emitted from the one light source (the light source L1) and another light source (the light source L2) of the plurality of the light sources; second receiving the second light emitted to and reflected from the reference reflector to measure a second distance to the reference reflector; correcting a difference in timing of light emission between the one light source and said another light source based on the first distance and the second distance (a first measured distance and a second measured distance); and calculating a distance to an object based on third light emitted from the one light source and said another light source at a common timing of which the difference has been corrected.

In this configuration, the light-receiving system 20 receives light projected from the light-projection system 10 and reflected from the object with the difference in the timing of light emission between the plurality of light sources being corrected. This reduces the occurrence of an error in detection, thus improving the accuracy of the measurement of a distance to an object.

Such a configuration increases the accuracy of measurement of the distance to an object.

Note that when the distance measurement device includes any other light sources except the two light sources, a sequence of the second turning-on step, the second measuring step, and the correcting step are preferably performed for each of the light sources except the tow light sources. In this case, differences in timing of light emission between the one light source and the other light sources can be corrected in the correcting step.

—Variation 1—

Figure 7:
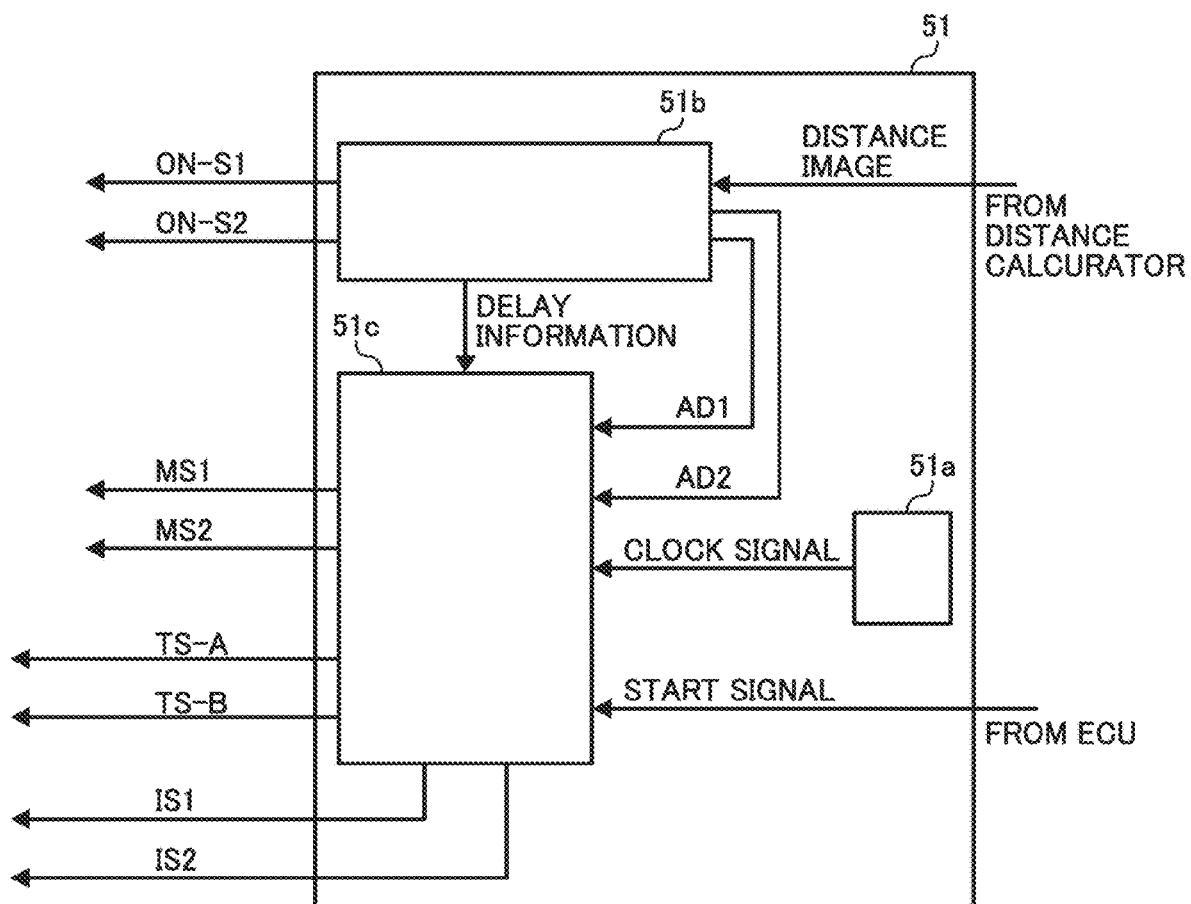
FIG. 7 is an illustration of a configuration of a timing controller according to variation 1 of an embodiment of the present disclosure.

FIG. 7 is a block diagram of a timing controller 51 of a controller in a distance measurement device according to variation 1 of an embodiment of the present disclosure.

As illustrated in FIG. 7, the timing controller 51 according to variation 1 generates modulated signals MS1 and MS2 to be input into drive circuits D1 and D2 according to a clock signal (which is referred to also as "clock"). The timing controller 51 also adjusts the amounts of delay of the modulated signal MS1 and MS2 according to the levels of adjustment data AD1 and AD2, respectively, in the unit of clock tick.

More specifically, the timing controller 51 includes a clock generator 51a, a regulator 51b, and a signal generator 51c. The clock generator 51a generates a reference clock signal. The regulator 51b generates the adjustment data AD1 and AD2 and delay information based on a first-ON signal ON-S1, a second-ON signal ON-S2 (to control the drive circuits D1 and D2 to switch between ON and OFF) and a distance image (distance data). The signal generator 51c generates the modulated signal MS1 and MS2 based on the clock signal, the adjustment data AD1 and AD2, a start signal, and the delay information, and further generates a timing signal TS-A, a timing signal TS-B, a first indication signal IS1, and a second indication signal IS2 based on the clock signal, the start signal, and the delay information.

Figure 8:
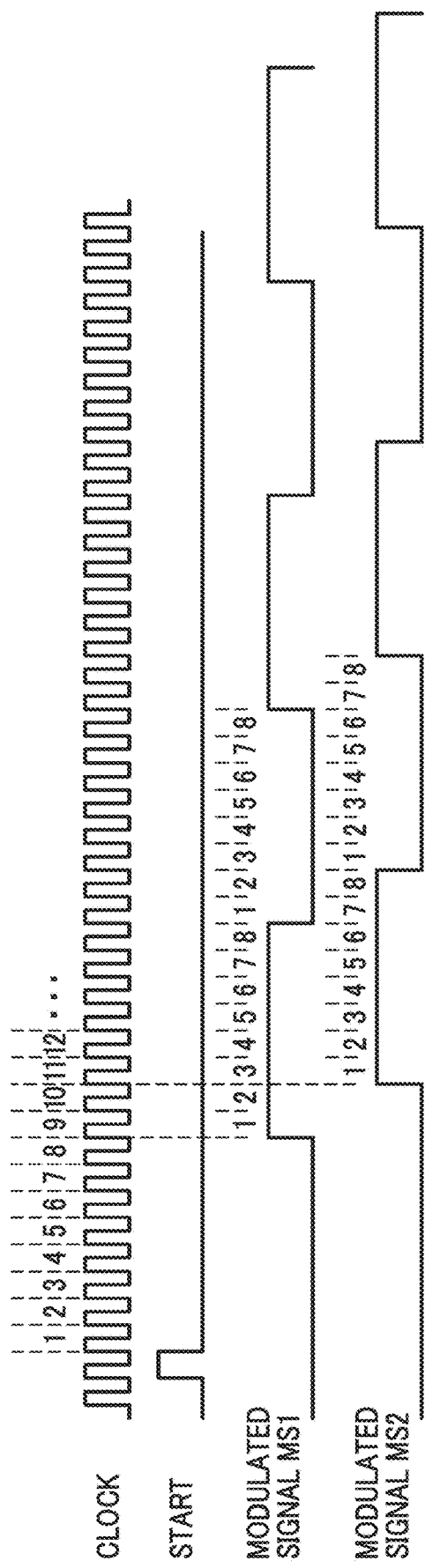
FIG. 8 is a timing chart for describing a method for generating modulated signals according to variation 1.

FIG. 8 is a time chart of the modulated signals MS1 and MS2 generated based on the clock signal according to variation 1.

In the time chart, the adjustment data AD1 represents "8" in the unit of clock tick, the adjustment data AD2 represents "10", and each modulated signal represents a pulse width of "8".

The signal generator 51c incorporates a start counter that starts counting the clocks of the clock signal sent from the clock generator 51a when a start signal enters the signal generator 51c. The signal generator 51c changes the level of the modulated signal MS1 to "H" (high) when the start counter reads "8" that is the same as the value of the adjustment data AD1. Subsequently, a first pulse-width counter of the signal generator 51c starts counting until the counted value reaches "8" that is the pulse width of the modulated signal MS1. When the first pulse-width counter reads "8", the signal generator 51c changes the level of the modulated signal MS1 to "L" (low level). The first pulse-width counter is then reset to "1" and starts counting again. When the counted value reaches "8", the signal generator 51c changes the level of the modulated signal MS1 to "H". Such repetitive processes generate the modulated signal MS1.

The signal generator 51c changes the level of the modulated signal MS2 to "H" (high) when the start counter reads "10" that is the same as the value of the adjustment data AD2. Subsequently, a second pulse-width counter of the signal generator 51c starts counting until the counted value reaches "8" that is the pulse width of the modulated signal MS2. When the second pulse-width counter reads "8", the signal generator 51c changes the level of the modulated signal MS2 to "L" (low level). The second pulse-width counter is then reset to "1" and starts counting again. When the counted value reaches "8", the signal generator 51c changes the level of the modulated signal MS2 to "H". Such repetitive processes generate the modulated signal MS2.

Such a configuration outputs the modulated signals MS1 and MS2 according to the values of the adjustment data AD1 and AD2. This means that adjusting the values of the adjustment data AD1 and AD2 adjust the timings of output of the modulated signal MS1 and MS2 to allow the timings of light emission of the light sources L1 and L2 to coincide with each other.

According to the above-described variation 1, the modulated signal MS1 and MS2 are generated by a logic circuit using the clock signal, so that small-scale circuitry allows generating the modulated signals MS1 and MS2.

In the distance measurement device according to variation 1, the timing controller 51 (control device) adjusts the timings of input of the modulated signals MS1 and MS2 to the drive circuits D1 and D2 according to the difference between the first distance and the second distance. The first distance is a distance calculated by the distance calculator when one (light source L1) of the plurality of light sources (e.g., two light sources L1 and L2) emits light. The second distance is a distance calculated by the distance calculator when the one light source and another light source (light source L2) of the plurality of light sources emit light.

In the distance measurement device according to variation 1, the controller including the timing controller 51 and the distance calculator further includes the clock generator 51a to generate a clock signal and a counter to count clocks of the clock signal. The timing controller 51 generates the modulated signal MS1 and MS2 based on the counted value of the counter and the first and second measured distances, to adjust the timings of input of the modulated signals MS1 and MS2 into the drive circuits D1 and D2.

—Variation 2—

Figure 9:
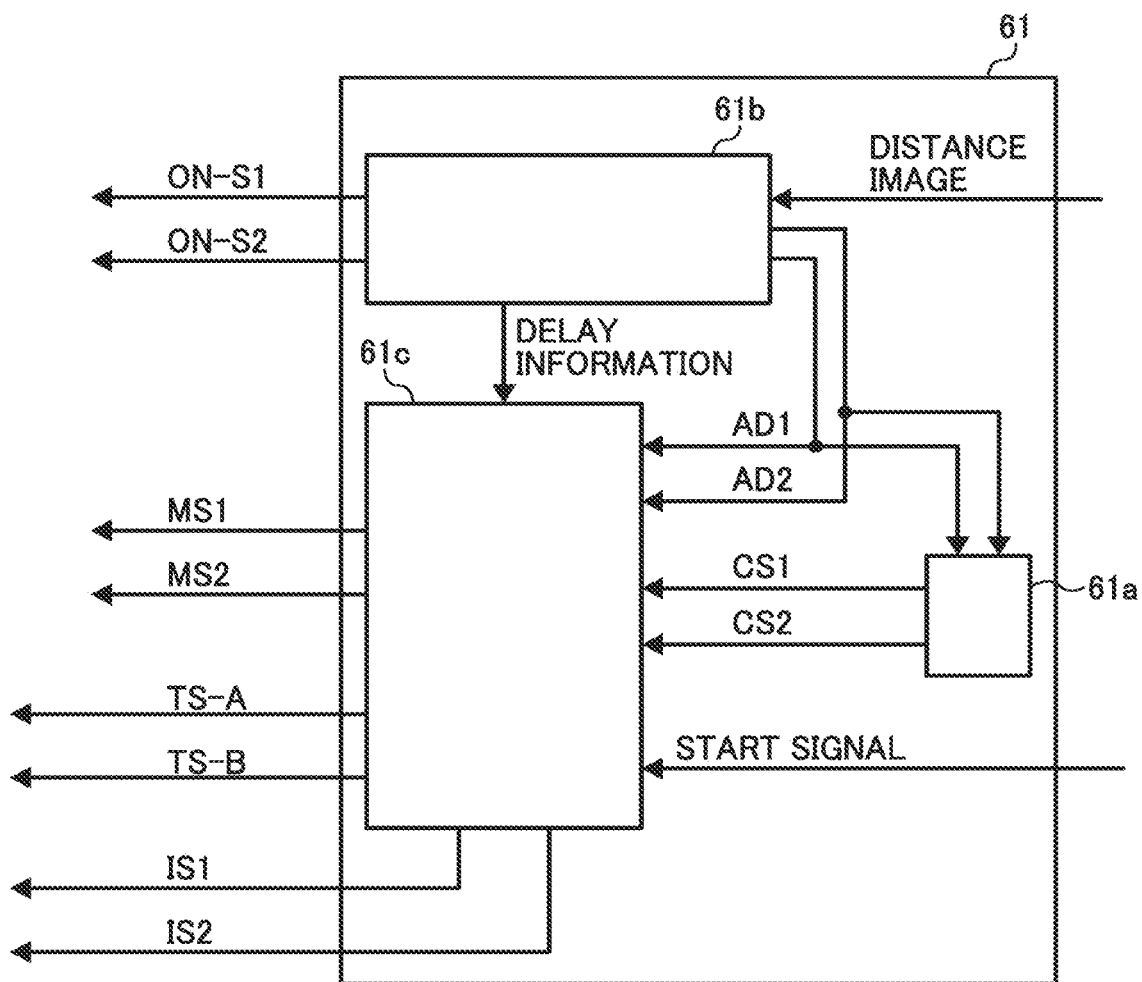
FIG. 9 is an illustration of a configuration of a timing controller according to variation 2 of an embodiment of the present disclosure.

FIG. 9 is a block diagram of a timing controller 61 in a controller of a distance measurement device according to variation 2.

In the timing controller according to variation 2 as illustrated in FIG. 9, a regulator 61b generates and outputs adjustment data AD1 and AD2 to a clock generator 61a. The clock generator 61a generates and outputs clock signals CS1 and CS2 to a signal generator 61c. The clock generator 61a changes the phases of the clock signals CS1 and CS2 according to the adjustment data AD1 and AD2 sent from the regulator 61b, and outputs the clock signals CS1 and CS2 between which the phase is changed, to the signal generator 61c.

Figure 10:
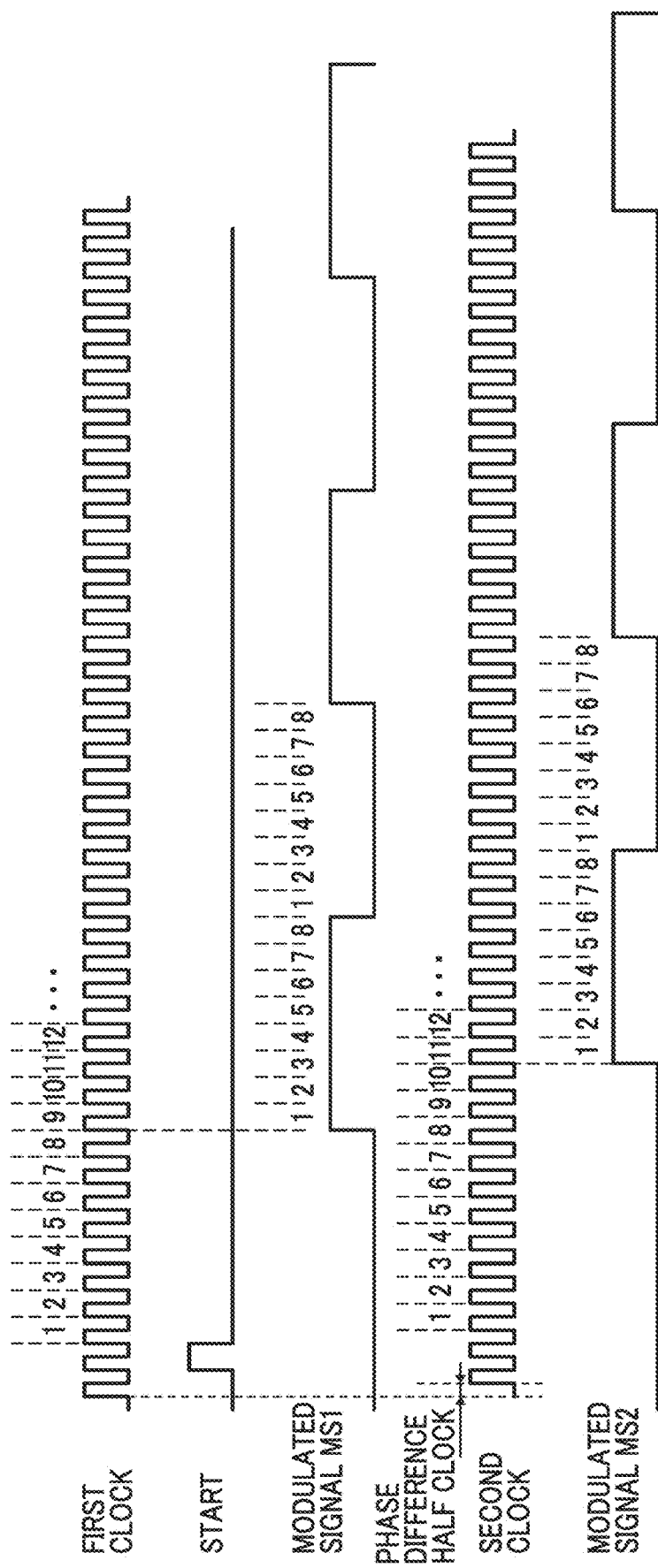
FIG. 10 is a timing chart for describing a method for generating modulated signals according to variation 1.

FIG. 10 is a time chart of the modulated signals MS1 and MS2 generated based on the clock signals CS1 and CS2 and the adjustment data AD1 and AD2 according to variation 2.

In the time chart, the adjustment data AD1 represents "8" in the unit of clock tick, the adjustment data AD2 represents "10.5", and each modulated signal represents a pulse width of "8".

The signal generator 61c incorporates a first start counter that starts counting the clocks of the clock signal CS1 sent from the clock generator 61a when a start signal enters the signal generator 61c. The signal generator 61c changes the level of the modulated signal MS1 to "H" (high) when the start counter reads "8" that is the same as the value of the adjustment data AD1. Subsequently, a first pulse-width counter of the signal generator 61c starts counting until the counted value reaches "8" that is the pulse width of the modulated signal MS1. When the first pulse-width counter reads "8", the signal generator 61c changes the level of the modulated signal MS1 to "L" (low level). The first pulse-width counter is then reset to "1" and starts counting the clocks of the clock signal CS1 again. When the counted value reaches "8", the signal generator 61c changes the level of the modulated signal MS1 to "H". Such repetitive processes generate the modulated signal MS1.

The signal generator 61c generates the modulated signal MS2 based on the clock signal CS2. However, when the adjustment data AD2 that is "10.5" in the unit of clock tick enters the clock generator 61a, the clock generator 61a generates and outputs the clock signal CS2 with a phase delay of "0.5" (the number except the integer number of "10.5") clock, i.e., half a clock. That is, the clock signal CS2 as illustrated in FIG. 10 is delayed in phase from the clock signal CS1 by half a clock. The signal generator 61c generates the modulated signal MS2 using the clock signal CS2.

More specifically, the signal generator 61c includes a second start counter that starts counting the clocks of the clock signal CS2 sent from the clock generator 61a when a start signal enters the signal generator 61c. The signal generator 61c changes the level of the modulated signal MS2 to "H" (high) when the start counter reads "10" that is the integer number value of the adjustment data AD2. Subsequently, a second pulse-width counter of the signal generator 61c starts counting until the counted value reaches "8" that is the pulse width of the modulated signal MS2. When the second pulse-width counter reads "8", the signal generator 61c changes the level of the modulated signal MS2 to "L" (low level). The second pulse-width counter is then reset to "1" and starts counting again. When the counted value reaches "8", the signal generator 61c changes the level of the modulated signal MS2 to "H". Such repetitive processes generate the modulated signal MS2.

In the above-described timing controller 61 according to variation 2, the clock generator 61a generates the clock signals CS1 and CS2 between which the phase is adjusted, and the signal generator 61c generates the modulated signal MS1 and the modulated signal MS2 according to the clock signal CS1 and the clock signal CS2. Generating such modulated signals MS1 and MS2 allows a shorter-time adjustment than the clock width of the clock signal CS1, thereby successfully allowing the timings of light emission of the light sources L1 and L2 to coincide with each other, resulting in a decrease in error in measurement.

In the distance measurement device according to variation 2, the timing controller 61 (control device) adjusts the timings of output of the modulated signals MS1 and MS2 to the drive circuits D1 and D2 according to the difference between the first distance and the second distance. The first distance is a distance calculated by the distance calculator when one (light source L1) of the plurality of light sources (e.g., two light sources L1 and L2) emits light. The second distance is a distance calculated by the distance calculator when the one light source and another light source (light source L2) of the plurality of light sources emit light.

In the distance measurement device according to variation 2, the controller that includes the timing controller 61 and the distance calculator further includes the clock generator 61a and a plurality of counters. The plurality of clock generators 61a generate a plurality of clock signals between which a phase differs from each other, based on the first measured distance and the second measured distance. The plurality of counters counts clocks of the plurality of clock signals. The timing controller 51 adjusts the timings of output of the modulated signals MS1 and MS2 to the drive circuits D1 and D2 based on the counted value of the counter and the first and second measured distances.

In variation 2, the clock signal CS2 is delayed in phase by half a clock from the clock signal CS1. Alternatively, the clock signal CS2 may be delayed in phase by 1/N of a clock where N is the integral number that is, e.g., 3 or greater.

—Variation 3—

Figure 11:
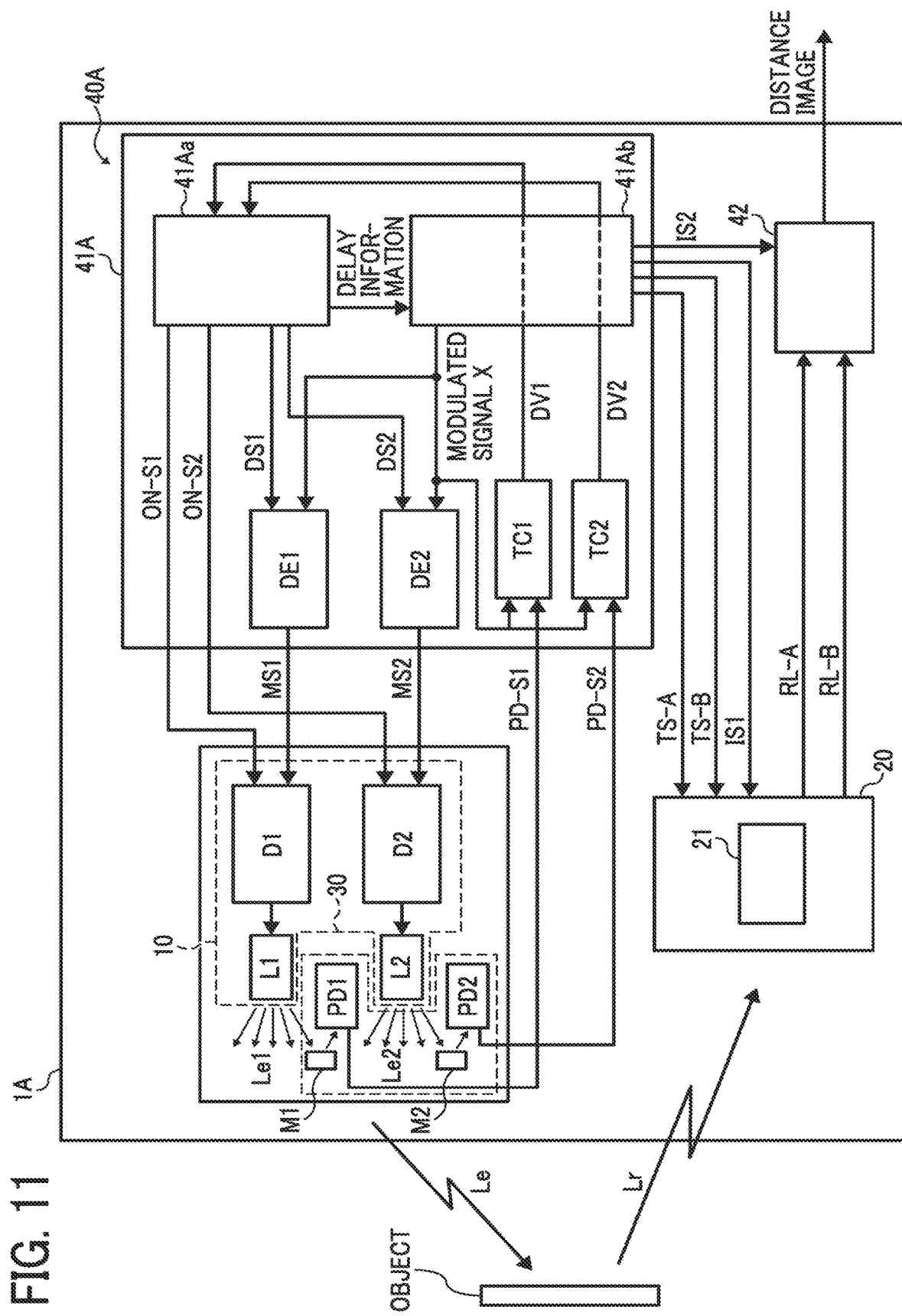
FIG. 11 is a schematic illustration of a configuration of a distance measurement device according to variation 3 of an embodiment of the present disclosure.

FIG. 11 is a schematic illustration of a configuration of a distance measurement device 1A according to variation 3 of the present disclosure.

The distance measurement device 1A includes a light-projection system 10, a light-receiving system 20, a detector 30, and a controller 40A that includes a timing controller 41A (control device), and a distance calculator (calculator) 42.

The light-projection system 10 includes two light sources L1 and L2, two drive circuits D1 and D2, and a projection optical system. The drive circuits D1 and D2 drive the light sources L1 and L2 to emit light. The projection optical system projects the light emitted from the light sources L1 and L2 toward the front of a vehicle. In the present embodiment, light emitting elements, such as semiconductor lasers and LEDs, are suitable for the light sources. Alternatively, other types of light emitting elements may be employed.

When the timing controller 41A sends a first-ON signal ON-S1 that is at the "H" (high) level to the drive circuit D1, the drive circuit D1 applies modulation current MC1 according to a modulated signal MS1 to the light source L1. When the first-ON signal ON-S1 sent from the timing controller 41 is at the "L" (low) level, the drive circuit D1 does not generate a drive current (drive current is OFF).

When the timing controller 41A sends a second-ON signal ON-S2 that is at the "H" level to the drive circuit D2, the drive circuit D2 applies modulation current MC2 according to a modulated signal MS2 to the light source L2. When the second-ON signal ON-S2 sent from the timing controller 41 is at the "L" level, the drive circuit D2 does not generate a drive current (drive current is OFF).

The light source L1 having received the modulation current MC1 emits modulated light according to the modulation current MC1, and the modulated light is emitted from the projection optical system, as emitted-pulsed light Le1.

The light source L2 having received the modulation current MC2 emits modulated light according to the modulation current MC2, and the modulated light is emitted from the projection optical system, as emitted-pulsed light Le2.

More specifically, the emitted-pulsed light Le, which is projected from the light-projection system 10, is light in which the emitted-pulsed light Le1 and the emitted-pulsed light Le2 are superimposed on each other.

In this case, an object (object to be measured) that is within a detectable range (detectable area by the sum of light output of the light sources L1 and L2) in the light projection range of the light projection system 10 (the projection range of the projection optical system) is irradiated with the projected light (the emitted-pulsed light Le).

The projection optical system according to the present embodiment may be either one of a scanning optical system that includes, for example, a light deflector, and a non-scanning optical system that includes, for example, a diffusing board. In either case, the projection optical system preferably achieves a sufficient projection range in a horizontal direction and a vertical direction to detect (sense) an object in the area in front of a vehicle.

The light-receiving system 20 includes an area sensor 21 and a light-receptive optical system. The area sensor 21 includes a plurality of photosensors, such as photodiodes and phototransistors. The plurality of photosensors is two-dimensionally arranged and corresponds to a plurality of pixels, respectively. The light-receptive optical system includes light-collecting elements and guides light reflected from an object to the area sensor 21.

Each photosensor of the area sensor 21 includes two charge accumulation units A1 and B1. Each photosensor receives modulated light (reflected-pulsed light Lr) that has been emitted to and reflected by the object, and then accumulates charges generated by the received light, according to the timing signals TS-A and TS-B output from the timing controller 41.

Specifically, each photosensor accumulates charges on the charge accumulation unit A1 when the timing signal TS-A is "H", and accumulates charges on the charge accumulation unit B1 when the timing signal TS-B is "H".

The timing controller 41A repeatedly outputs the modulated signal, the timing signal TS-A, and the timing signal TS-B, so that each photosensor continues to accumulate charges on the charge accumulation units A1 and B1. After repetitive accumulation of charges for a predetermined times, the timing controller 41 stops outputting the modulated signals MS1 and MS2 and the timing signal TS-A and TS-B, and outputs a first instruction signal IS1 to the area sensor 21 to instruct the area sensor 21 to output received-light data.

The area sensor 21 sequentially outputs received-light data RL-A and received-light data RL-B that respectively represent the amounts of charges accumulated on the charge accumulation units A1 and B1 of each photosensor.

The timing controller 41A outputs a second instruction signal IS2 to the distance calculator 42 to instruct the distance calculator 42 to calculate distance data for each pixel based on the received-light data RL-A and RL-B sent from the area sensor 21. Thus, the distance calculator 42 generates a distance image (distance data). The distance data is calculated from the received light data RL-A and RL-B in the above-described manner.

The timing controller 41A includes delay elements DE1 and DE2, a regulator 41Aa, a signal generator 41Ab, and time counters TC1 and TC2.

The delay element DE1 delays a modulated signal X generated by the signal generator 41Ab according to the level of a first delay signal DS1 sent from the regulator 41Aa, and outputs the delayed modulated signal X as a modulated signal MS1.

The delay element DE1 delays a modulated signal X generated by the signal generator 41Ab according to the level of a first delay signal DS1 sent from the regulator 41Aa, and outputs the delayed modulated signal X as a modulated signal MS1.

As described above, the timings of light emission at the light sources L1 and L2 (the rising timings of the waveforms of the emitted-pulsed light Le1 and the emitted-pulsed light Le2) change with the first delay signal DS1 and the second delay signal DS2, respectively.

The signal generator 41Ab repeatedly generates and outputs a pulsed or sinusoidal modulated signal X to the delay elements DE1 and DE2 for predetermined times. The signal generator 41Ab repeatedly generates, based on delay information output from the regulator 41Aa, a timing signal TS-A and a timing signal TS-B, each having the same waveform as the waveform of the modulated signal X, and repeatedly outputs the generated timing signals TS-A and TS-B to the area sensor 21 for predetermined times.

In the present embodiment, the signal generator 41b preferably outputs the timing signal TS-A at the same timing as the rising timing of the waveform of the emitted-pulsed light Le (the timing of emission of the light source L1) as illustrated in FIG. 2. The delay information refers to a delay time that is a time period from a time when the modulated signal X is output from the signal generator 41b to a time when the emitted-pulsed light Le is output from the light source L1 (the waveform of the emitted-puled light Le rises). Based on the delay time (delay information), the timing of output of the timing signal TS-A is set to coincide with the timing of emission of the light source L1. As described above, the timing signal TS-A becomes "H" at the same timing as the emitted-pulsed light Le becomes "H", and becomes "L" when the time period of the pulse width Tw of the timing signal TS-A ends. The timing signal TS-B becomes "H" at the same time at which the timing signal TS-A becomes "L". Then, the timing signal TS-B becomes "L" when the time period of the pulse width Tw of the timing signal TS-B ends.

The signal generator 41Ab repeatedly generates and sends the modulated signal X and the timing signals TS-A and TS-B to the delay elements DE1 and DE2 and the area sensor 21, respectively for the predetermined times. Subsequently, the signal generator 41b outputs the first instruction signal IS1 and the second instruction signal IS2 to the area sensor 21 and the distance calculator 42, respectively.

The regulator 41Aa generates, based on a delay value DV1 and a delay value DV2 sent from the time counters TC1 and TC2, the first delay signal DS1 and the second delay signal DS2 to regulate the amounts of delay of the delay elements DE1 and DE2.

More specifically, the regulator 41Aa compares the delay values DV1 and DV2 to generate a second delay signal DS2 of which the delay value DV2 is the same as the delay value DV1 or generate a first delay signal DS1 of which the delay value DV1 is the same as the delay value DV2. Alternatively, the regulator 41Aa may generate a first delay signal DS1 and a second delay signal DS2 to obtain a predetermined delay value. Note that the delay signals DS1 and DS2 generated by the regulator 41Aa may not have a common delay value (that is, the delay value DV1 may differ from the delay value DV2). In other words, the difference between the delay value DV1 and the delay value DV2 is preferably reduced.

The regulator 41Aa generates a first-On signal ON-S1 and a second-ON signal ON-S2 to control the drive circuits D1 and D2 of the light projection system 10 to switch between ON and OFF, respectively. The regulator 41Aa controls the first-On signal ON-S1 and the second-ON signal ON-S2 to correct the difference in the timing of light emission between the light sources L1 and L2.

The detector 30 includes a first mirror M1, a second mirror M2, a first photodiode PD1, and a second photodiode PD2. The first mirror M1 allows a part of light emitted from the light source L1 to enter the first mirror M1. The second mirror M2 allows a part of light emitted from the light source L2 to enter the second mirror M2. The first photodiode PD1 receives light reflected by the first mirror M1. The second photodiode PD2 receives light reflected by the second mirror M2.

That is, the first mirror M1 is disposed to reflect the part of the light emitted from the light source L1 toward the first photodiode PD1. The second mirror M2 is disposed to reflect the part of the light emitted from the light source L2 toward the second photodiode PD2. Note that the remaining part (most part) of the light emitted from the light source L1 and the remaining part (most part) of the light emitted from the light source L2 are projected from the projection optical system as the emitted-pulsed light Le1 and the emitted-pulsed light Le2.

The first photodiode PD1 receives the light reflected by the first mirror M1, converts the received light into an electrical signal, and outputs the electrical signal as a first PD signal PD-S1 to the time counter TC1. The second photodiode PD2 receives the light reflected by the second mirror M2, converts the received light into an electrical signal, and outputs the electrical signal as a second PD signal PD-S2 to the time counter TC2.

The time counter TC1 measures the difference in rising timing of the waveform between a modulated signal X and the first PD signal PD-S1, and outputs the measured difference in timing as a delay value DV1. The time counter TC2 measures the difference in rising timing between the modulated signal X and the second PD signal PD-S2, and outputs the measured difference in timing as a delay value DV2. Each of the time counters TC1 and TC2 may be implemented with a time-to-digital-converter (TDC) circuit.

In variation 3, the signal generator 41Ab outputs a modulated signal X to the delay elements DE1 and DE2, and the light sources L1 and L2 emit light with a delay time that is delayed by the delay elements DE1 and DE2 and the drive circuits D1 and D2 as compared to the modulated signal X. The first photodiode PD1 and the second photodiode PD2 receive the light emitted from the light sources L1 and L2, and outputs the first PD signal PD-S1 and the second PD signal PD-S2 that are delayed as compared to the modulated signal X.

Figure 12:
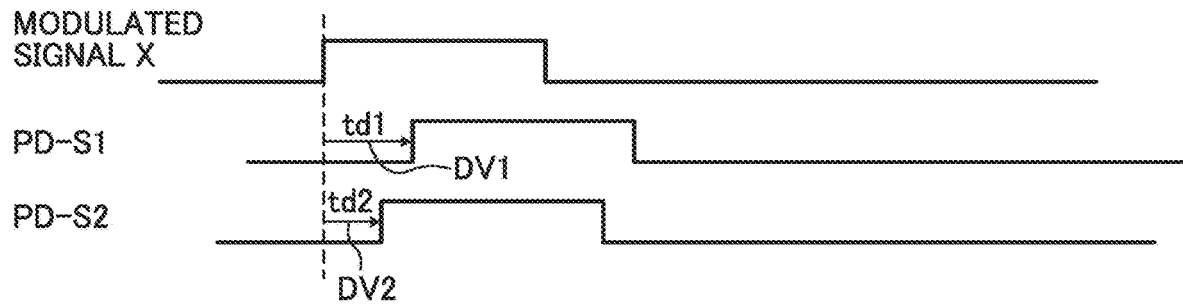
FIG. 12 is a timing chart of a modulated signal and a photodiode (PD)

FIG. 12 represents the modulated signal X, the first PD signal PD-S1, the second PD signal PD-S2, a measured delay value DV1, and a measured delay value DV2. In FIG. 12, the light source L1 emits light with a delay time td1 relative to the modulated signal X, and the first photodiode PD1 outputs the first PD signal PD-S1 with the delay time td1 to the time counter TC1. Further, the light source L2 emits light with a delay time td2 relative to the modulated signal X, and the first photodiode PD2 outputs the first PD signal PD-S1 with the delay time td2 to the time counter TC2. The time counter TC1 measures and outputs the delay time td1 as the delay value DV1 to the regulator 41Aa. The time counter TC2 measures and outputs the delay time td2 as the delay value DV2 to the regulator 41Aa.

Figure 13:
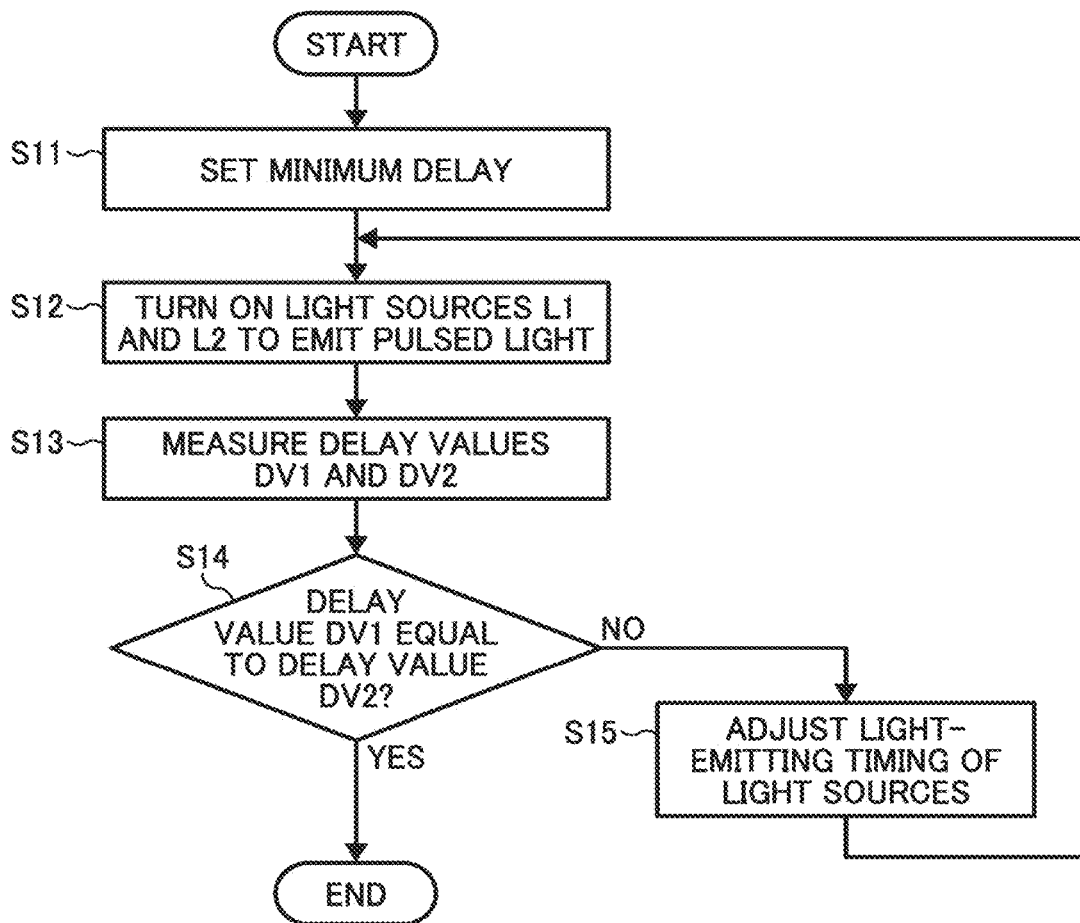
FIG. 13 is a flowchart of a correction process for correcting a difference in timing of light emission between light sources according to variation 3 of an embodiment of the present disclosure.

The following describes a method (a correction process for the difference in timing of emission) for correcting the difference in timing of emission between the light sources L1 and L2 in the distance measurement device 1A according to variation 3, referring to FIG. 13. FIG. 13 is a flowchart of a series of computational algorithms executed by the controller 40A, according to the present embodiment. In the present embodiment, the correction process for the difference in timing of emission is performed at prescribed time intervals in consideration of variations in capability of circuit elements and wirings between the drive circuits D1 and D2 in manufacturing or over time. Alternatively, the correction process may be irregularly (e.g., in starting up the distance measurement device) performed.

In the first step, i.e., step S11, the regulator 41Aa outputs a first delay signal DS1 and a second delay signal DS2 to minimize delay values.

In step S12, the light sources L1 and L2 emit pulsed light. Specifically, the signal generator 41Ab repeatedly generates and outputs a pulsed modulated signal X as illustrated in FIG. 12 to the delay elements DE1 and DE2. Subsequently, the delay elements DE1 and DE2 delay modulated signals X according to the levels of delay indicated by the first delay signal DS1 and the second delay signal DS2, respectively, and outputs the delayed modulated signals X as modulated signals MS1 and MS2 to the drive circuits D1 and D2, respectively. The signal generator 41Ab also outputs the modulated signal X to the time counters TC1 and TC2, and the time counters TC1 and TC2 start measuring time.

The drive circuits D1 and D2 generate drive currents C1 and C2 according to the modulated signals MS1 and MS2 to allow the light sources L1 and L2 to emit light, and the light emitted from the light sources L1 and L2 is partly projected as emitted-pulsed light Le1 and Le2 from the projection optical system. In this case, the remaining part of the light emitted from the light source L1 is reflected by the first mirror M1, and enters the first photodiode PD1. Similarly, the remaining part of the light emitted from the light source L2 is reflected by the second mirror M2, and enters the second photodiode PD2.

The first photodiode PD1 and the second photodiode PD2 output the first PD signal PD-S1 and the second PD signal PD-S2 to the time counters TC1 and TC2 according to the light having entered the first photodiode PD1 and the second photodiode PD2.

In variation 3, the drive circuits D1 and D2 generates the drive currents C1 and C2 with a circuit delay. Such a circuit delay differs between the drive circuits D1 and D2 due to a variation in capability between circuit elements. For this reason, the first PD signal PD-S1 and the second PD signal PD-S2 enter the time counters TC1 and TC2, respectively at different timings from each other, as illustrated in FIG. 12.

In step S13, the time counters TC1 and TC2 measure delay values DV1 and DV2, respectively. More specifically, when the time counter TC1 receives the first PD signal PD-S1, the time counter TC1 stops measuring time and determines the delay value DV1 that is a time period from when the time counter $TC_1$ receives the modulated signal X to when the time counter TC1 receives the first PD signal PD-S1. Subsequently, the time counter TC1 outputs the delay value DV1 to the regulator 41Aa. The delay value DV1 corresponds to the delay time td1 in FIG. 12. When the time counter TC2 receives the second PD signal PD-S2, the time counter TC2 stops measuring time and determines the delay value DV2 that is a time period from when the time counter TC2 receives the modulated signal X to when the time counter TC2 receives the second PD signal PD-S2. Subsequently, the time counter TC2 outputs the delay value DV2 to the regulator 41Aa. The delay value DV2 corresponds to the delay time td2 in FIG. 12.

In step S14, the regulator 41Aa determines whether the delay value DV1 and the delay value DV2 are equal to each other. More specifically, when the delay value DV1 is equal to the delay value DV2, the regulator 41Aa outputs the measured delay values DV1 and DV2 as delay information to the signal generator 41Ab. Thus, the correction process for correcting the difference in timing of light emission is completed. By contrast, when the delay value DV1 is not equal to the delay value DV2, the process shifts to step S15.

In step S15, the controller 40A adjusts the timing of light emission of the light sources L1 and L2. More specifically, the regulator 41Aa adjusts at least one of the first delay signal DS1 and the second delay signal DS2 based on the difference between the delay value DV1 and the delay value DV2.

For example, when the delay value DV1 is greater than the delay value DV2, the regulator 41Aa increases the level of the second delay signal DS2 to increase the output delay time of the modulated signal MS2. When the delay value DV2 is greater than the delay value DV1, the regulator 41Aa increases the level of the first delay signal DS1 to increase the output delay time of the modulated signal MS1. Alternatively, the regulator 41Aa may adjust the first delay signal DS1 and the second delay signal DS2 to increase or reduce the delay value DV1 and the delay value DV2 close to (preferably to coincide with) a predetermined delay value. In other words, the regulator 41Aa may adjust at least one of the first delay signal DS1 and the second delay signal DS2 to reduce the difference between the delay value DV1 and the delay value DV2.

This configuration corrects (reduces) the difference in timing of light emission between light sources L1 and L2. When step S15 is completed, the process returns to step S12.

The configuration according to variation 3 reduces the difference in timing of light emission of the light sources L1 and L2. Thus, the distance measurement device 1A according to variation 3, which projects light in which light emitted from the light sources L1 and L2 is superimposed on each other, also achieves a reduction in errors in measurement of the distance and the accurate distance measurement.

—Variation 4—

Figure 14:
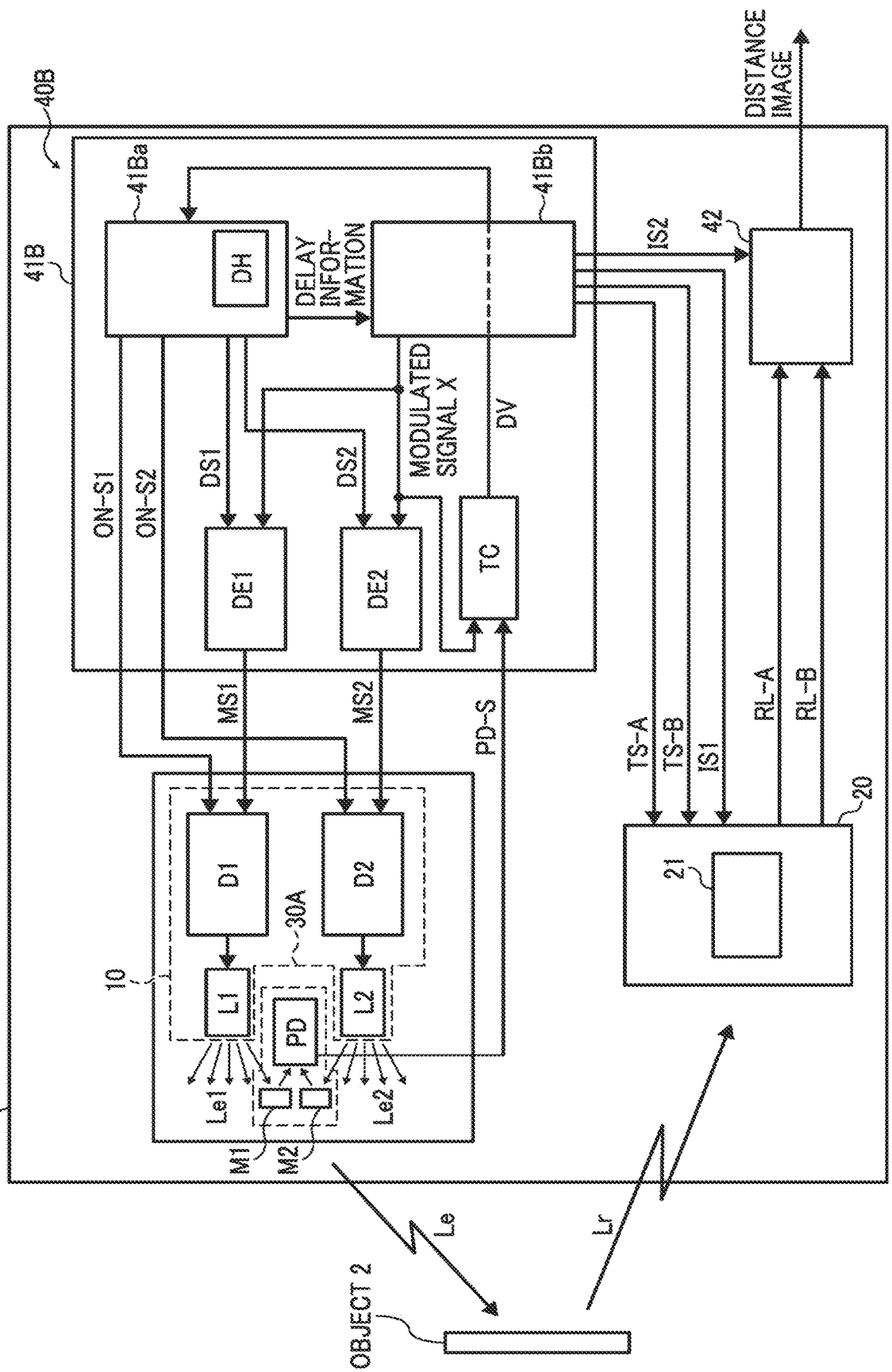
FIG. 14 is a schematic illustration of a configuration of a distance measurement device according to variation 4 of an embodiment of the present disclosure.

FIG. 14 is a schematic illustration of a configuration of a distance measurement device 1B according to variation 4 of the present disclosure. As illustrated in FIG. 14, the distance measurement device 1B includes a detector 30A, a timing controller 41B, and a regulator 41Ba. The detector 30A includes a single photodiode PD. The timing controller 41B includes a single time counter TC. The regulator 41Ba includes a holder to hold a delay value.

In the distance measurement device 1B according to variation 4, a first mirror M1 guides a part of light emitted from the light source L1 to the photodiode PD, and a second mirror M2 guides a part of light emitted from the light source L2 to the photodiode PD. That is, both the part of the light emitted from the light source L1 and the part of the light emitted from the light source L2 enter the identical photodiode PD. FIG. 14 represents the cases in which two mirrors M1 and M2 are disposed. Alternatively, a single mirror that serves as both of the mirrors M1 and M2 may be disposed instead of the two mirrors M1 and M2.

Figure 15:
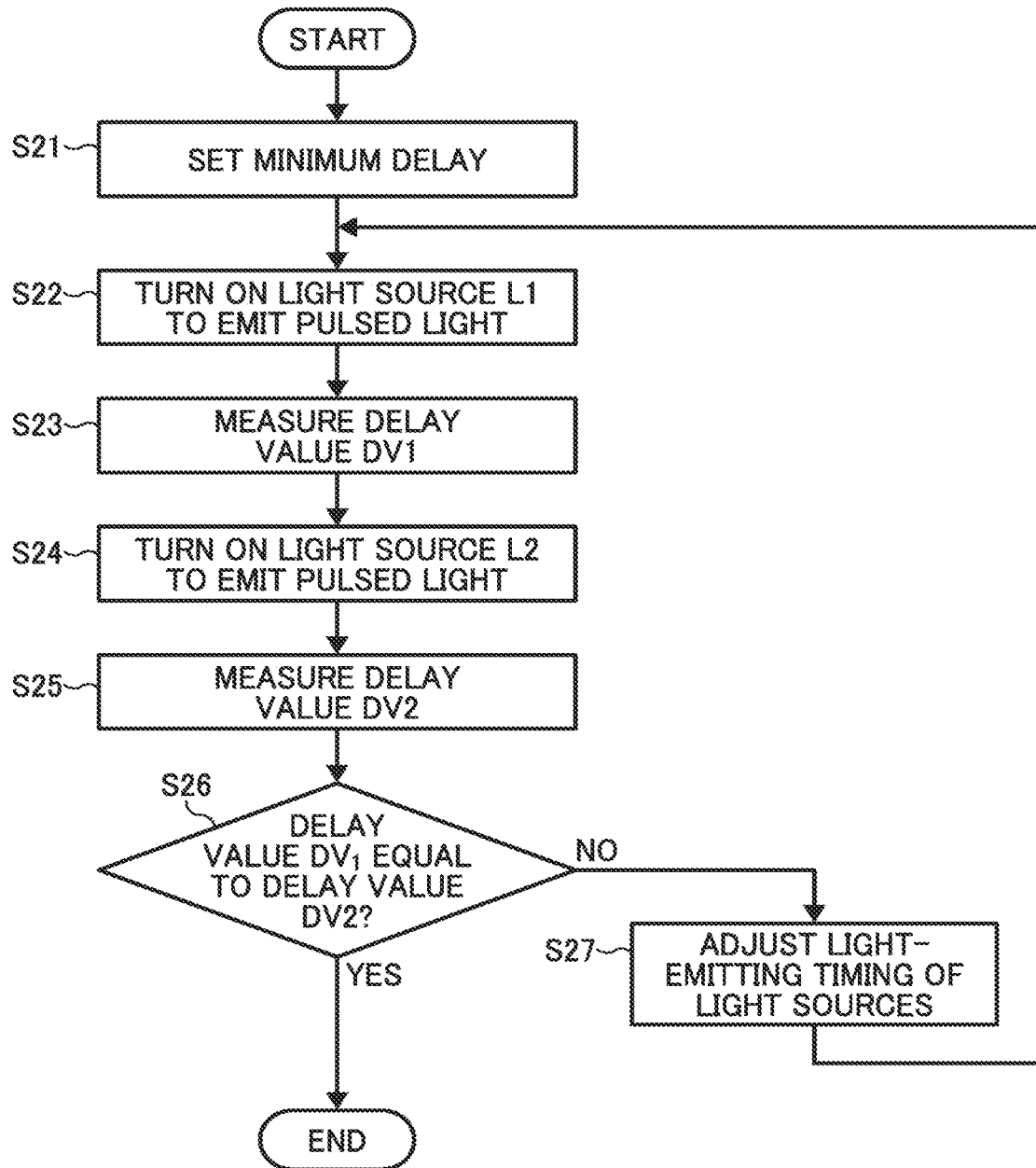
FIG. 15 is a flowchart of a correction process of light emission according to variation 4 of an embodiment of the present disclosure.

The following describes the method (a correction process for the difference in timing of emission) for correcting the difference in timing of emission between the light sources L1 and L2 in the distance measurement device 1B according to variation 4, referring to FIG. 15. FIG. 15 is a flowchart of a series of computational algorithms executed by the controller 40B, according to the present embodiment. In the present embodiment, the correction process for the difference in timing of emission is performed at prescribed time intervals, in consideration of variations in capability of circuit elements and wirings between the drive circuits D1 and D2 in manufacturing or over time. Alternatively, the correction process may be irregularly (e.g., in starting the distance measurement device) performed.

In the first step, i.e., step S21, the regulator 41Ba outputs a first delay signal DS1 and a second delay signal DS2 to minimize delay values.

In step S22, the light source L1 emits pulsed light. Specifically, the regulator 41Ba sets the first-On signal ON-S1 and the second-ON signal ON-S2 to the levels of "H" (height) and "L" (low), respectively to allow only the light source L1 to emit light.

Specifically, the signal generator 41Bb repeatedly generates and outputs a pulsed modulated signal X as illustrated in FIG. 12 to the delay elements DE1 and DE2. Subsequently, the delay elements DE1 and DE2 delay modulated signals X according to the levels of the first delay signal DS1 and the second delay signal DS2, respectively, and output the delayed modulated signals X as modulated signals MS1 and MS2 to the drive circuits D1 and D2, respectively. The signal generator 41Bb also outputs the modulated signal X to the time counter TC, and the time counter TC starts measuring time.

When the level of the first-On signal ON-S1 is "H", the drive circuit D1 generates a drive current C1 according to the modulated signal MS1 to allow the light source L1 to emit light as the emitted-pulsed light Le1. In this case, the level of the second-On signal ON-S2 is "L", and accordingly the drive circuit D2 does not generate a drive current C2 with the light source L2 OFF. A part of the light emitted from the light source L1 is projected from the projection optical system, and the remaining light is reflected by the first mirror M1 and enters the photodiode PD. Subsequently, the photodiode PD outputs a PD signal PD-S to the time counter TC according to the light having entered the photodiode PD.

In step S23, the time counter TC measures a delay value DV1. More specifically, when the time counter TC receives the PD signal PD-S, the time counter TC stops measuring time and determines the delay value DV that is a time period from when the time counter TC receives the modulated signal X to when the time counter TC receives the PD signal PD-S. Subsequently, the time counter TC outputs the delay value DV to the regulator 41Ba. The regulator 41Ba holds the delay value in the holder. In this case, the delay value held in the holder is referred to as a delay value DV1.

In step S24, the light source L2 emits pulsed light. Specifically, the regulator 41Ba sets the first-On signal ON-S1 and the second-ON signal ON-S2 to the levels of "L" and "H", respectively, to allow only the light source L2 to emit light. Specifically, the signal generator 41Bb repeatedly generates and outputs a pulsed modulated signal X as illustrated in FIG. 12 to the delay elements DE1 and DE2. Subsequently, the delay elements DE1 and DE2 delay modulated signals X according to the levels of the first delay signal DS1 and the second delay signal DS2, respectively, and output the delayed modulated signals X as modulated signals MS1 and MS2 to the drive circuits D1 and D2, respectively. The signal generator 41Bb also outputs the modulated signal X to the time counter TC, and the time counter TC starts measuring time.

When the level of the second-On signal ON-S2 is "H", the drive circuit D2 generates a drive current C2 according to the modulated signal MS2 to allow the light source L2 to emit light as the emitted-pulsed light Le2. In this case, the level of the first-On signal ON-S1 is "L", and accordingly the drive circuit D1 does not generate a drive current C1 with the light source L1 OFF. A part of the light emitted from the light source L2 is projected from the projection optical system, and the remaining light is reflected by the first mirror M2 and enters the photodiode PD. Subsequently, the photodiode PD outputs a PD signal PD-S to the time counter TC according to the light having entered the photodiode PD.

In step S25, the time counter TC measures a delay value DV2. More specifically, when the time counter TC receives the PD signal PD-S, the time counter TC stops measuring time and determines the delay value DV that is a time period from when the time counter TC receives the modulated signal X to when the time counter TC receives the PD signal PD-S. Subsequently, the time counter TC outputs the delay value DV to the regulator 41Ba. In this case, the delay value is referred to as a delay value DV2.

In step S26, the regulator 41Ba determines whether the delay value DV1 and the delay value DV2 are equal to each other. More specifically, the regulator 41Ba compares the delay value DV1 that is held in the holder with the delay value DV2 measured in step S25. More specifically, when the delay value DV1 is equal to the delay value DV2, the regulator 41Ba outputs the measured delay values DV1 and DV2 as delay information to the signal generator 41Bb. Thus, the correction process for correcting the difference in timing of light emission is completed. By contrast, when the delay value DV1 is not equal to the delay value DV2, the process shifts to step S27.

In step S27, the controller 40B adjusts the timing of light emission of the light sources L1 and L2. More specifically, the regulator 41Ba adjusts at least one of the first delay signal DS1 and the second delay signal DS2 based on the difference between the delay value DV1 and the delay value DV2.

For example, when the delay value DV1 is greater than the delay value DV2, the regulator 41Ba increases the level of the second delay signal DS2 to increase the output delay time of the modulated signal MS2. When the delay value DV2 is greater than the delay value DV1, the regulator 41Ba increases the level of the first delay signal DS1 to increase the output delay time of the modulated signal MS1. Alternatively, the regulator 41Ba may adjust the first delay signal DS1 and the second delay signal DS2 to increase or reduce the delay value DV1 and the delay value DV2 close to (preferably to coincide with) a predetermined delay value. In other words, the regulator 41Ba may adjust at least one of the first delay signal DS1 and the second delay signal DS2 to reduce the difference between the delay value DV1 and the delay value DV2.

This configuration corrects (reduces) the difference in timing of light emission between light sources L1 and L2. When step S27 is completed, the process returns to step S22.

The configuration according to variation prevents the difference in timing of light emission of the light sources L1 and L2. Thus, the distance measurement device 1B according to variation 4, which projects light in which light emitted from the light sources $L_1$ and $L_2$ is superimposed on each other, achieves a reduction in errors in measurement of the distance and the accurate distance measurement.

As described above, the distance measurement device 1B according to variation 4 includes fewer photodiodes PD and time counters TC than the number of the light sources. Such a configuration achieves a reduction in cost and an increase in accuracy of the distance measurement.

The above-described distance measurement devices 1A and 1B according to variations 3 and 4 each includes the light projection system 10, a light-receiving system 20, and a correction system. The light projection system 10 includes a plurality of light sources (e.g., two light sources L1 and L2) and a plurality of drive circuits (e.g., two drive circuits D1 and D2) that drives the plurality of light sources, respectively. The light-receiving system 20 receives light emitted from the light projection system 10 and reflected by an object. The correction system corrects the difference in the timing of light emission between the plurality of light sources.

In this configuration, the light-receiving system 20 receives light projected from the light-projection system 10 and reflected from the object with the difference in the timing of light emission between the plurality of light sources being corrected. This reduces the occurrence of an error in detection, thus improving the accuracy of the measurement of a distance to an object.

Such a configuration successfully reduces errors in detection, and increases the accuracy of measurement of the distance to an object.

The correction system includes a detector and a controller. The detector detects a part of light emitted from a plurality of light sources, respectively. The controller corrects the difference in timing of light emission between the light sources based on the detection results of the detector.

Such a configuration allows precisely correcting the difference in timing of light emission between the plurality of light sources in a direct manner by using the detector to detect a part of the light emitted from the light sources.

The plurality of drive circuits receives a plurality of modulated signals (e.g., two modulated signals MS1 and MS2) to drive the plurality of light sources to emit light, respectively. The controller includes a control device (timing controller 41B). The control device adjusts the timings of input of the modulated signals MS1 and MS2 into the drive circuits D1 and D2, based on the timings of light emission of the plurality of light sources and the timings of detection of the detector when the light sources emit light.

Such a simple configuration successfully increases the accuracy of measurement of the distance to an object.

The control device adjusts the timings of input of the modulated signals into the drive circuits to reduce the differences in elapsed time from the timing of light emission to the timing of detection between the light sources.

Such a configuration allows a simple method for correcting the difference in timing of light emission between the light sources L1 and L2, in which the control device generates a common (a single) modulated signal X that is to be modulated signals MS1 and MS2, and adjusts the timing of output of the modulated signal X to the drive circuits D1 and D2.

The control device preferably includes a regulator 41Ba and adjustment elements (delay elements DE1 and DE2). The regulator 41Ba generates an adjustment signal to adjust the timing of output of the modulated signals MS1 and MS2 based on the difference in elapsed time between the timing of light emission and the timing of detection. The adjustment elements adjust the timing of output of the modulated signals MS1 and MS2 according to the adjustment signals.

The detector preferably includes a light guide and a photoreceptor. The light guide includes optical members (for example, mirrors M1 and M2) fewer than or equal of the light sources to guide light emitted from a plurality of light sources (light sources L1 and L2). The photoreceptor includes photosensors (for example, photodiodes and phototransistors) fewer than or equal to the light sources to receive light guided by the light guide.

Note that when the photoreceptor includes fewer photosensors than the number of the light sources, the controller preferably controls the modulated signal for each of the light sources to switch between ON and OFF.

As an alternative to the mirror as an optical member of the light guide, a branch element may be used to branch light emitted from the light source into transmission light and reflected light. In such a case, the projection optical system projects the transmission light from the branch element and the photodiode PD receives the reflected light.

The light guide may include a light-collecting element (for example, a collecting lens or a collecting mirror) in the optical path between the optical member (for example, a mirror or a branch element) and each photosensor.

Alternatively, each photosensor may directly receive light emitted from the light source, without any light guides.

The distance measuring method according to variations 3 and 4 includes first detecting light emitted from one light source (a light source L1) of a plurality of light sources (for example, a light source L1 and a light source L2); first calculating a first difference in elapsed time between a timing of light emission of the one light source and a timing of the first detecting; second detecting light emitted from another light source (the light source L2) of the plurality of light sources; second calculating a second difference in elapsed time between a timing of light emission of said another light source and a timing of the second detecting; correcting a difference in timing of light emission between the one light source and said another light source based on the first difference in elapsed time and the second difference in elapsed time; and receiving light emitted from the one light source and said another light source to an object and reflected from the object to calculate a distance to the object In this configuration, the light-receiving system 20 receives light projected from the light-projection system 10 and reflected from the object with the difference in the timing of light emission between the plurality of light sources being corrected. This reduces the occurrence of an error in detection, thus improving the accuracy of the measurement of a distance to an object.

Such a configuration successfully reduces errors in detection, and increases the accuracy of measurement of the distance to an object.

Note that when the distance measurement device includes any other light sources except the two light sources, a sequence of the second detection step, the second calculating step, and the correcting step are preferably performed for each of the light sources except the tow light sources. In this case, differences in timing of light emission between the one light source and the other light sources can be corrected in the correcting step.

—Variation 5—

Figure 16:
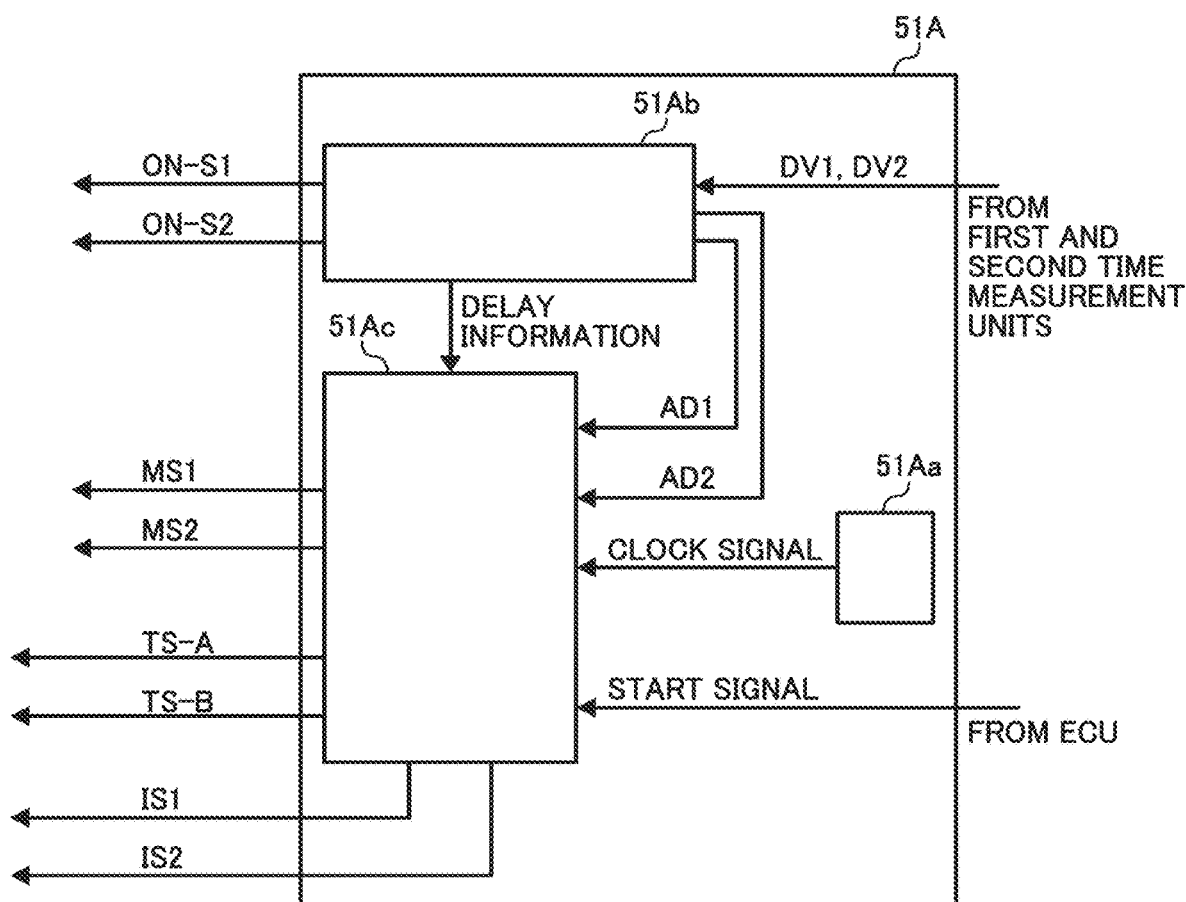
FIG. 16 is an illustration of a configuration of a timing controller according to variation 5 of an embodiment of the present disclosure.

FIG. 16 is a block diagram of a timing controller 51A of a controller in a distance measurement device according to variation 5 of an embodiment of the present disclosure.

As illustrated in FIG. 16, the timing controller 51A according to variation 5 generates modulated signals MS1 and MS2 according to a clock signal CS. The timing controller 51A also adjusts the amount of delay of the modulated signal MS1 and MS2 according to the levels of adjustment data AD1 and AD2, respectively, in the unit of clock tick.

More specifically, the timing controller 51A includes a clock generator 51Aa, a regulator 51Ab, and a signal generator 51Ac. The clock generator 51Aa generates a reference clock signal. The regulator 51Ab generates the adjustment data AD1 and AD2 based on a first-ON signal ON-S1, a second-ON signal ON-S2 (to control the drive circuits D1 and D2 to switch between ON and OFF) and delay values DV1 and DV2. The signal generator 51Ac generates the modulated signal MS1 and MS2 based on the clock signal, the adjustment data AD1 and AD2, and a start signal, and further generates a timing signal TS-A, a timing signal TS-B, a first indication signal IS1, and a second indication signal IS2 based on the clock signal and the start signal.

Figure 17:
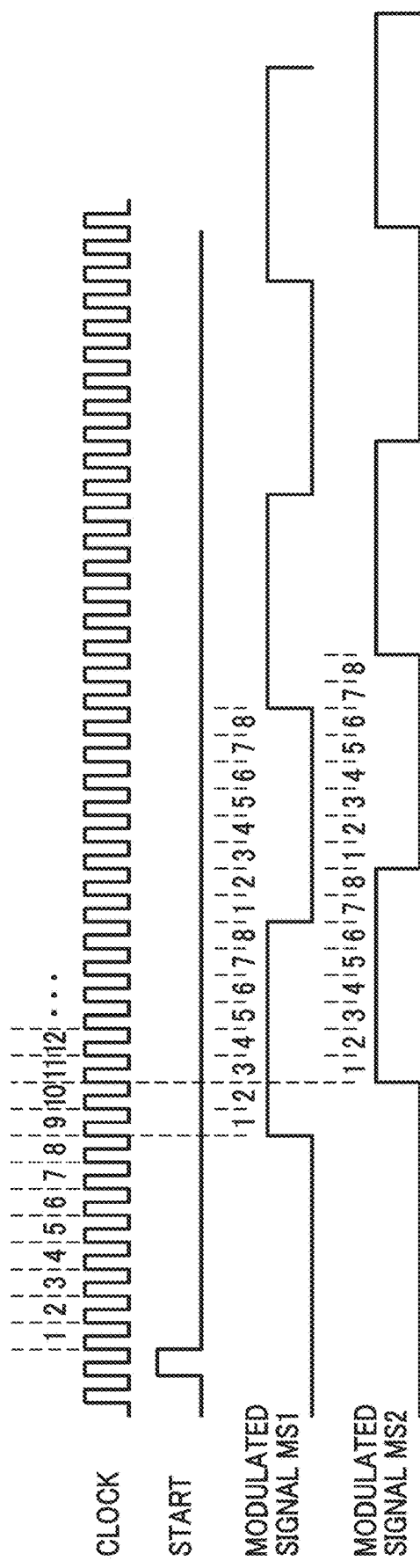
FIG. 17 is a timing chart for describing a method for generation modulated signals according to variation 5.

FIG. 17 is a timing chart for describing a method in which the signal generator 51Ac generates the modulated signals MS1 and MS2 according to the clock signal CS, the adjustment data AD1, and the adjustment data AD2.

In the time chart, the adjustment data AD1 represents "8" in the unit of clock tick, the adjustment data AD2 represents "10", and each modulated signal represents a pulse width of "8". The signal generator 51Ac incorporates a start counter that starts counting the clocks of the clock signal sent from the clock generator 51Aa when a start signal from, e.g., an electronic control unit (ECU), enters the signal generator 51Ac. The signal generator 51Ac changes the level of the modulated signal MS1 to "H" (high) when the start counter reads "8" that is the same as the value of the adjustment data AD1. Subsequently, a first pulse-width counter of the signal generator 51Ac starts counting until the counted value reaches "8" that is the pulse width of the modulated signal MS1. When the second pulse-width counter reads "8", the signal generator 51Ac changes the level of the modulated signal MS1 to "L" (low level). The first pulse-width counter is then reset to "1" and starts counting the clocks of the clock signal CS1 again. When the counted value reaches "8", the signal generator 51Ac changes the level of the modulated signal MS1 to "H". Such repetitive processes generate the modulated signal MS1.

The signal generator 51Ac changes the level of the modulated signal MS2 to "H" (high) when the start counter reads "10" that is the same as the value of the adjustment data AD2. Subsequently, a second pulse-width counter of the signal generator 51Ac starts counting until the counted value reaches "8" that is the pulse width of the modulated signal MS2. When the second pulse-width counter reads "8", the signal generator 51Ac changes the level of the modulated signal MS2 to "L" (low level). The second pulse-width counter is then reset to "1" and starts counting the clocks of the clock signal CS2 again. When the counted value reaches "8", the signal generator 51Ac changes the level of the modulated signal MS2 to "H". Such repetitive processes generate the modulated signal MS2.

Such a configuration outputs the modulated signals MS1 and MS2 according to the values of the adjustment data AD1 and AD2. This means that adjusting the values of the adjustment data AD1 and AD2 adjust the timings of output of the modulated signal MS1 and MS2 to allow correcting the difference in timing of light emission between the light source L1 and the light source L2.

According to the above-described variation 5, the modulated signal MS1 and MS2 are generated by a logic circuit using the clock signal, so that small-scale circuitry allows generating the modulated signals MS1 and MS2.

In the above-described distance measurement device according to variation 5, the controller further includes the clock generator 51Aa to generate a clock signal and a counter to count clocks of the clock signal. The timing controller 51A (control device) adjusts the timings of output of the modulated signals MS1 and MS2 to the drive circuits D1 and D2 based on the counted value of the counter, the timings of light emission of the plurality of light sources, and the differences in timing of detection of the detector between the light sources having emitted light.

—Variation 6—

Figure 18:
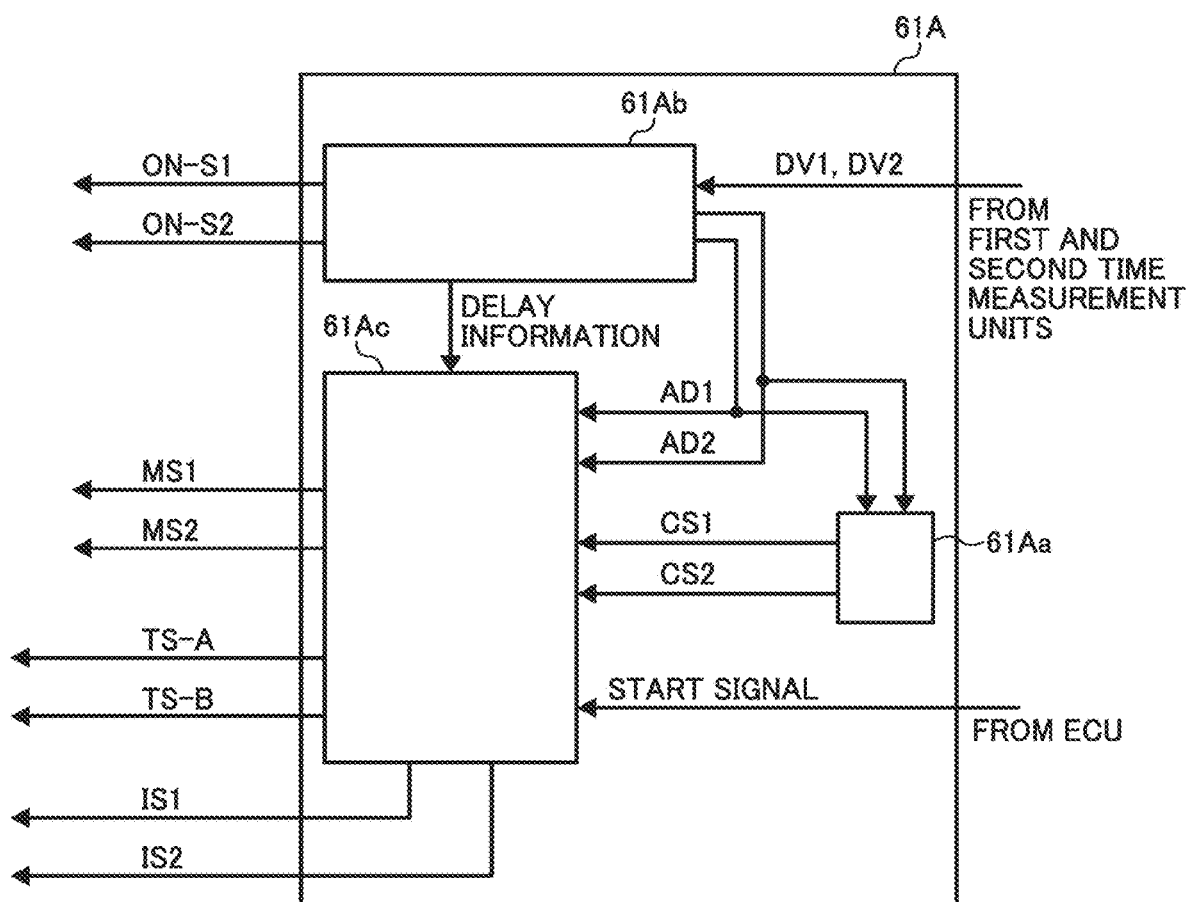
FIG. 18 is schematic illustration of a configuration of a timing controller according to variation 6 of an embodiment of the present disclosure.

FIG. 18 is a block diagram of a timing controller 61A of a controller in a distance measurement device according to variation 6 of an embodiment of the present disclosure. In the timing controller according to variation 6 as illustrated in FIG. 18, a regulator 61Ab generates and outputs adjustment data AD1 and AD2 to a clock generator 61Aa. The clock generator 61Aa generates and outputs clock signals CS1 and CS2 to a signal generator 61Ac. The clock generator 61Aa changes the phases of the clock signals CS1 and CS2 according to the adjustment data AD1 and AD2 sent from the regulator 61Ab, and outputs the clock signals CS1 and CS2 between which the phase is changed, to the signal generator 61Ac.

FIG. 19 is a timing chart for describing a method in which the signal generator 61Ac generates the modulated signals MS1 and MS2 according to the clock signals CS1 and CS2 and the adjustment data AD1 and AD2.

In the time chart, the adjustment data AD1 represents "8" in the unit of clock tick, the adjustment data AD2 represents "10.5", and each modulated signal represents a pulse width of "8". The signal generator 61Ac incorporates a first start counter that starts counting the clocks of the clock signal CS1 sent from the clock generator 61Aa when a start signal from, e.g., the ECU, enters the signal generator 61Ac. The signal generator 61Ac changes the level of the modulated signal MS1 to "H" (high) when the first start counter reads "8" that is the same as the value of the adjustment data AD1. Subsequently, a first pulse-width counter of the signal generator 61Ac starts counting until the counted value reaches "8" that is the pulse width of the modulated signal MS1. When the second pulse-width counter reads "8", the signal generator 61Ac changes the level of the modulated signal MS1 to "L" (low level). The first pulse-width counter is then reset to "1" and starts counting the clocks of the clock signal CS1 again. When the counted value reaches "8", the signal generator 61Ac changes the level of the modulated signal MS1 to "H". Such repetitive processes generate the modulated signal MS1.

The signal generator 61Ac generates the modulated signal MS2 based on the clock signal CS2. However, when the adjustment data AD2 that is "10.5" in the unit of clock tick enters the clock generator 61Aa, the clock generator 61Aa generates and outputs the clock signal CS2 with a phase delay of "0.5" (the number except the integer number of "10.5") clock, i.e., half a clock. That is, the clock signal CS2 as illustrated in FIG. 19 is delayed in phase from the clock signal CS1 by half a clock. The signal generator 61Ac generates the modulated signal MS2 using the clock signal CS2. The signal generator 61Ac incorporates a second start counter that starts counting the clocks of the clock signal CS2 sent from the clock generator 61Aa when a start signal from, e.g., the ECU, enters the signal generator 61Ac. The signal generator 61Ac changes the level of the modulated signal MS2 to "H" (high) when the first start counter reads "10" that is the same as the value of the adjustment data AD2. Subsequently, a second pulse-width counter of the signal generator 61Ac starts counting until the counted value reaches "8" that is the pulse width of the modulated signal MS2. When the second pulse-width counter reads "8", the signal generator 61Ac changes the level of the modulated signal MS2 to "L" (low level). The second pulse-width counter is then reset to "1" and starts counting the clocks of the clock signal CS2 again. When the counted value reaches "8", the signal generator 61Ac changes the level of the modulated signal MS2 to "H". Such repetitive processes generate the modulated signal MS2.

In the above-described timing controller 61A according to variation 6, the clock generator 61Aa generates the clock signals CS1 and CS2 between which the phase is adjusted, and the signal generator 61Ac generates the modulated signal MS1 and the modulated signal MS2 according to the clock signal CS1 and the clock signal CS2. Generating such modulated signals MS1 and MS2 allows the timings of output of the modulated signals MS1 and MS2 to coincide with each other in a shorter precision than the clock width of the clock signal CS1, thereby successfully allowing the timings of light emission of the light sources L1 and L2 to coincide with each other, resulting in a decrease in error in measurement.

In the above-described distance-measuring device according to variation 6, the controller further includes the clock generator 61Aa and a plurality of counters. The clock generator 61Aa generates a plurality of clock signals having different phases based on the difference in elapsed time (each delay value) between the timing of light emission of each of a plurality of light sources and the timing of detection of the detector. The control device (the timing controller 61A) adjusts the timings of input of the modulated signals into the drive circuits based on the counted values of the plurality of counters and the above-described difference in timing of detection.

In the above-described embodiment and variations, an area sensor is employed as a photodetector of a light-receiving system. Alternatively, the area sensor may be a line sensor including a plurality of light-receiving elements (e.g., photodiodes and phototransistors) that is unidimensionally arranged, or may be one light-receiving element. In such a case, for example, a scanning projection optical system is employed to cause a plurality of light sources of which differences in the timing of light emission are corrected to simultaneously emit light so that light-emitting elements receive the light and output signals (that have substantially the same waveform). In the scanning projection optical system, the output signals of the light-receiving elements are binarized based on a threshold value, and the timing of light reception is determined based on the timing at which the value of the output signal coincides with the threshold value. Further, the distance to an object is determined by the timing of light reception and the timing of light emission. Such a configuration successfully reduces errors in detection, and increases the accuracy of measurement of the distance to an object.

In the above-described embodiment and variations, a photo-transmitter may not include a projection optical system. In other words, a light source may directly project light to a target region.

More specifically, the distance measurement device and the method for measuring distance may be widely applied over the fields of distance measuring techniques using the time-of-flight (TOF) method.

The distance measurement device and the method for measuring distance according to the embodiments and variations of the present disclosure may be employed to recognize the two-dimensional or three dimensional shape of an object or to detect the presence of an object.

The distance measurement device according to the present disclosure is not limited to the configurations in which the distance-measuring device is mounted on a movable body. Alternatively, the distance measurement device according to the present disclosure may be mounted on a stationary body. Alternatively, the distance measurement device according to the present disclosure may be used alone.

Further, the concrete numerical values, shapes, and the like are just examples and can be appropriately modified without departing from the spirit of the present disclosure.

The following describes the process of thinking, in which the inventors have conceived of the above-described embodiments and variations.

A distance measurement device has been known that employs a sensor of distance image (area sensor) to calculate the distance to a target object based on a phase difference between the irradiation light, i.e., modulated light irradiated to a target space and the light reflected from the target object in the target space, thereby generating a two-dimensional distance image of which each pixel value represents distance.

In the distance measurement device, with an increase in intensity of light emitted to a target space, the distance image sensor receives reflected light reflected having greater intensity, which increases the signal-to-noise (SN) ratio of received-light signal of the distance image sensor. As a result, the accuracy of measurement of the distance measurement device increases. Accordingly, a method has been known in which the distance measurement device includes a plurality of light sources as an irradiation device to irradiate light to a target space, thereby superimposing light rays to increase light intensity.

For example, an optical distance-measuring device has been known that includes a laser rangefinder to emit pulsed light using a plurality of light sources (laser diodes) and drive circuits.

In such an optical distance-measuring device, the plurality of light sources is connected to the plurality of drive circuits that receives a common lighting signal (modulated signal) to supply electric current to the plurality of light sources, thereby causing the plurality of light source to emit light.

However, it has been found that with variation in capability of circuit elements and wirings between the drive circuits, the drive circuits switch on (supply electric current to) the light sources at different timings. This undesirably causes the light sources to emit light at different timings, thereby increasing the time interval between the superimposed light rays as compared to a desired time interval, thus causing errors in measurement.

Therefore, the inventors have conceived of the above-described embodiments to cope with such circumstances.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A distance measurement device comprising:
a projection optical system including:
a plurality of light sources; and
a plurality of drive circuits to drive the plurality of light sources;
a light-receiving system to receive light projected from the projection optical system and reflected by an object; and
a correction system to correct a difference in timing of light emission between the plurality of light sources,
wherein the correction system includes a controller to correct the difference in timing of light emission between the plurality of light sources based on data regarding the light received by the light-receiving system,
wherein the plurality of drive circuits receives a plurality of modulated signals to drive the plurality of light sources, and
wherein the controller includes:
circuitry to calculate a distance to the object based on the data regarding the light received by the light-receiving system; and
control circuitry to adjust timings of input of the plurality of modulated signals into the plurality of drive circuits based on a calculation result of the circuitry to calculate, and
wherein the control circuitry adjusts the timings of input of the plurality of modulated signals to the plurality of drive circuits based on a first distance calculated by the circuitry to calculate when one light source of the plurality of light sources emits light and a second distance calculated by the circuitry to calculate when the one light source and another light source of the plurality of light sources emit light, the timings being adjusted in order to decrease a difference between the first distance and the second distance.

2. The distance measurement device according to claim 1, further comprising a reference reflector disposed within a projection range of the projection optical system, the reference reflector disposed at a distance that is detectable with a light output of the one light source.

3. The distance measurement device according to claim 1, wherein the control circuitry includes:
regulator circuitry configured to generate at least one adjustment signal to adjust the timings of input of the modulated signals based on the first distance and the second distance; and
adjustment circuitry configured to adjust the timings of input of the modulated signals according to the at least one adjustment signal.

4. The distance measurement device according to claim 1, wherein the controller further includes:
a clock generator to generate a clock signal; and
a counter to count a clock of the clock signal, and
wherein the control circuitry adjusts the timings of input of the modulated signals based on a counted value of the counter, the first distance, and the second distance.

5. The distance measurement device according to claim 1, wherein the controller further includes:
a clock generator to generate a plurality of clock signals having different phases based on the first distance and the second distance; and
a plurality of counters to count clocks of the plurality of clock signals, and
wherein the control circuitry adjusts the timings of input of the plurality of modulated signals based on counted values of the plurality of counters, the first distance, and the second distance.

6. The distance measurement device according to claim 1, wherein the correction system includes:
a detector to detect light emitted from each of the plurality of light sources,
wherein the controller corrects the difference in timing of light emission between the plurality of light sources based on a detection result of the detector.

7. The distance measurement device according to claim 6, wherein the detector includes:
a light guide including at least one optical element fewer than or equal to the plurality of light sources, to partially guide light emitted from each of the plurality of light sources; and
a photoreceptor including at least one photosensor fewer than or equal to the plurality of light sources, to receive the light guided by the light guide.

8. The distance measurement device according to claim 1, wherein the light-receiving system includes an area sensor including a plurality of photoreceptors that corresponds to a plurality of pixels.

9. The distance measurement device according to claim 8, wherein the area sensor includes a plurality of charge accumulation sections for each pixel.

10. A movable device comprising:
the distance measurement device according to claim 1, and
a movable body on which the distance measurement device is mounted.

11. A distance measuring method comprising:
first irradiating a reference reflector with first light emitted from one light source of a plurality of light sources;
first measuring a first distance to the reference reflector by receiving the first light emitted to and reflected from the reference reflector;
second irradiating the reference reflector with second light emitted from the one light source and another light source of the plurality of the light sources;
second measuring a second distance to the reference reflector based on the second received light by receiving the second light emitted to and reflected from the reference reflector;
correcting a difference in timing of light emission between the one light source and said another light source based on the first distance and the second distance in order to decrease a difference between the first distance and the second distance; and
calculating a distance to an object based on third light emitted from the one light source and said another light source at a common timing of which the difference has been corrected by the correcting.

* * * * *